(12) United States Patent
Ullrich et al.

(10) Patent No.: US 8,330,960 B2
(45) Date of Patent: Dec. 11, 2012

(54) ALL OPTICAL AND HYBRID REFLECTION SWITCH AT A SEMICONDUCTOR/GLASS INTERFACE DUE TO LASER BEAM INTERSECTION

(75) Inventors: Bruno Ullrich, Wayne, OH (US); Artur Erlacher, Velden (AT)

(73) Assignee: Bowling Green State University, Bowling Green, OH (US)

( * ) Notice: Subject to any disclaimer, the term of this patent is extended or adjusted under 35 U.S.C. 154(b) by 0 days.

(21) Appl. No.: 12/925,566

(22) Filed: Oct. 25, 2010

(65) Prior Publication Data

US 2011/0109972 A1    May 12, 2011

Related U.S. Application Data

(62) Division of application No. 11/437,277, filed on May 19, 2006, now Pat. No. 7,826,058.

(51) Int. Cl.
*G01N 21/55* (2006.01)

(52) U.S. Cl. .................................. 356/447; 356/445

(58) Field of Classification Search .......... 356/445–447, 356/369–370, 612, 421, 255, 47–48, 425, 356/243.8
See application file for complete search history.

(56) References Cited

U.S. PATENT DOCUMENTS

2004/0208584 A1* 10/2004 Keller ............................. 398/88
2006/0182155 A1*  8/2006 Windpassinger et al. ........ 372/9
* cited by examiner

*Primary Examiner* — Tri T Ton
(74) *Attorney, Agent, or Firm* — Marshall & Melhorn, LLC

(57) ABSTRACT

The present invention includes a method of changing intensity of a reflected beam which may be expressed as a method of changing the amount of reflected light from a beam of light, the method comprising: (a) providing a substrate bearing a film of a reflective material; (b) directing a first beam of light at a reflecting point upon the reflective material so as to create a reflecting beam therefrom; (c) directing a second beam of light at the reflecting point upon the reflective material so as to alter the amount of light in the reflecting beam, and (d) detecting the change in the amount of light in the reflecting beam. The invention also includes an apparatus for changing the amount of reflected light from a beam of light and measuring that change, as well as related apparatus for a pulsed optical signal.

3 Claims, 26 Drawing Sheets

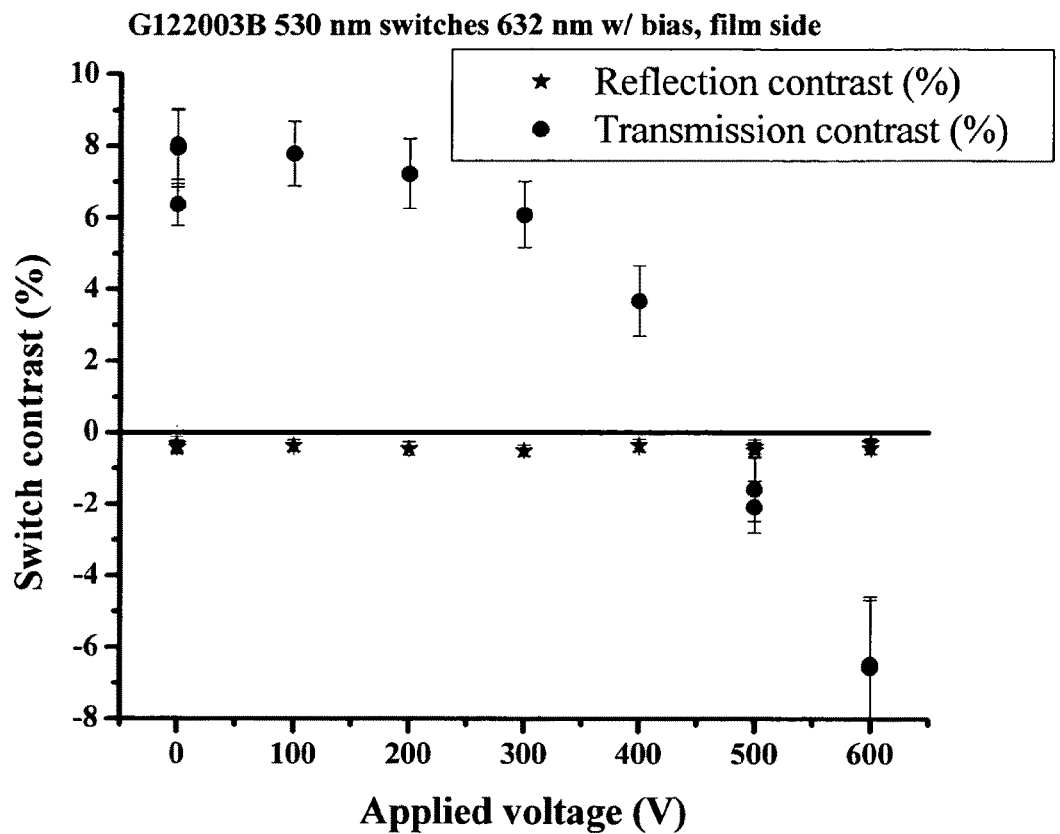
Figure 3: Switch contrasts versus applied voltage (film-side)

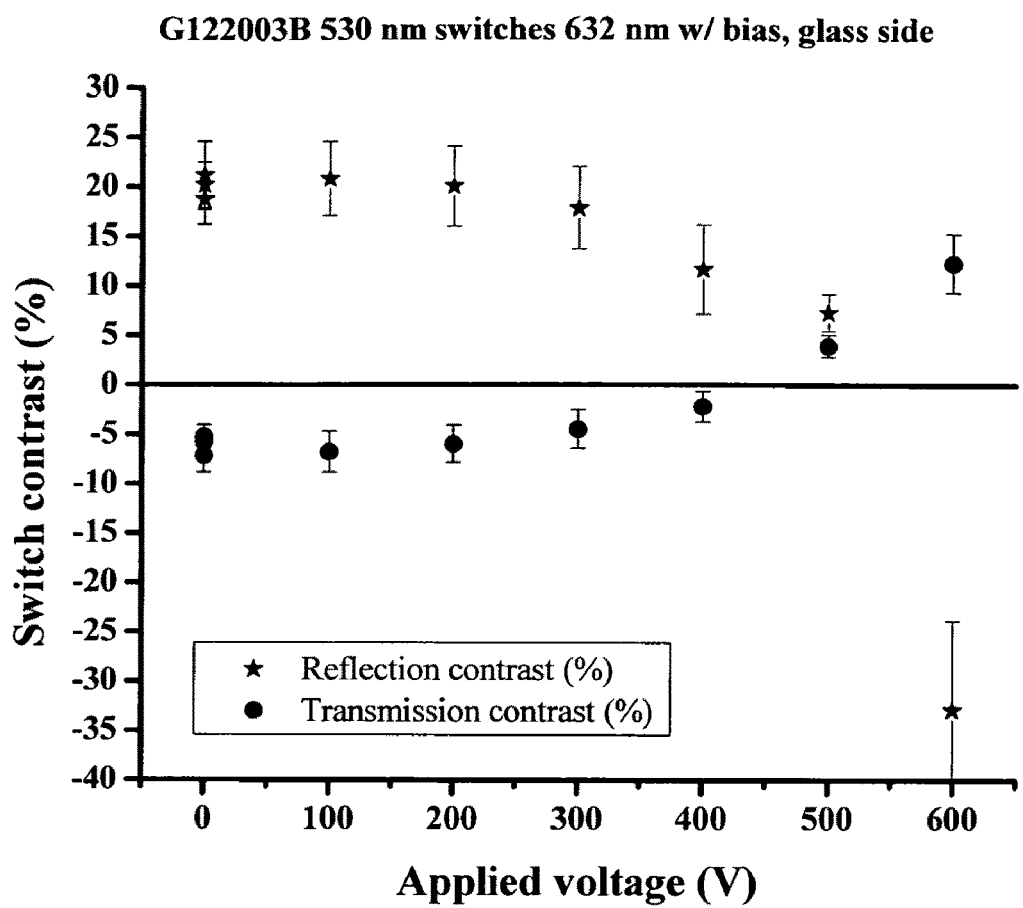
Figure 4: Switch contrasts versus applied voltage (glass-side)

Figure 6: Reflection switch with and without applied bias (glass side)

Figure 8: Realization of an all-optical NAND gate by crossing of three laser beams. The switch medium used was GaAs:Zn on glass.

Figure 9: Realization of an all-optical NOR gate by crossing of three laser beams. The measurement is the same as in Fig. 8.

Figure 10: Transmission kinetics (Δ*T*) of thin-film GaAs:Si on glass at 630 nm.

Figure 11: Reflection kinetics (ΔR) at 630 nm of the GaAs:Zn/glass interface

Figure 12: Experimental arrangement for measuring the all-optical and hybrid mode of the GaAs/glass interface in reflection geometry.

ALL OPTICAL AND HYBRID REFLECTION SWITCH AT A SEMICONDUCTOR/GLASS INTERFACE DUE TO LASER BEAM INTERSECTION

RELATED APPLICATION DATA

This application is a divisional of U.S. application Ser. No. 11/437,277, filed May 19, 2006 now U.S. Pat. No. 7,826,058, which is hereby incorporated herein in its entirety by reference.

TECHNICAL FIELD OF THE INVENTION

The present invention is in the field of switches, particularly in the field of optical data processing and transmission.

BACKGROUND AND SUMMARY OF THE INVENTION

More than twenty years ago, in the late 1970s and early 1980s, it was expected that non-linearities of semiconductors permit the construction of integrated low-power ($\mu$W), room temperature, and fast (picosecond; "ps") all-optical devices. Gibbs H M, Tarng S S, Jewell J L, Weinberger D A, Tai K, Gossard A C, McCall, S L, Passner A and Wiegmann W 1982 *Appl. Phys. Lett.* 41 221. Specifically, nonlinear GaAs etalons appeared to be promising devices for performing optical logic operations in massively parallel architectures at rates extending into the GHz range. Jewell J L, Lee Y H, Duffy J F, Gossard A C and Wiegmann W 1986 *Appl. Phys. Lett.* 48 1342.

However, the "switching reality" stubbornly rejected the transformation of etalon prototypes into mass-market products since, as the main reason, the power consumption of etalons does not allow the realization of concepts with affordable power needs. After the boom surrounding all-optical computing during the mid-1980s, experts in the field have abandoned non-linear photonics for all-optical data management. Gibbs H M and Khitrova G 1990 *Nonlinear Photonics* ed by H M Gibbs, G Khitrova and N Peyghambarian (Berlin: Springer) p 1.

Furthermore, the ongoing fast progress in electronics requires extremely smart photonic devices in order to motivate a technology change.

Optical switching continues to play a major role in modern fiber-optic telecommunications systems. They are essential in optical add/drop, cross connect, and ring protection applications.

Nevertheless, the full application potential of semiconductors for photonics is still not fully explored and will emerge if an effective fast linear low power switch can be produced in a very simple manner.

SUMMARY OF THE INVENTION

Proceeding from and in contrast to the reported efforts in the literature [4-6], the present invention therefore includes methods and apparatus based upon and using the change in a reflected beam by the use of a second beam directed at the point of reflection. The present invention also includes the use of an optional semiconductor that acts as a smart interface rather than an active device itself, toward the development of a switching device.

Method of Changing Intensity of Reflected Beam

The present invention includes a method of changing intensity of a reflected beam which may be expressed as a method of changing the amount of reflected light from a beam of light, the method comprising: (a) providing a substrate bearing a film of a reflective material (preferably in the form of a substrate bearing a film of a reflective material); (b) directing a first beam of light at a reflecting point upon the reflective material so as to create a reflecting beam therefrom; (c) directing a second beam of light at the reflecting point upon the reflective material so as to alter the amount of light in the reflecting beam, and (d) detecting the change in the amount of light in the reflecting beam.

The reflective material may be selected from any material that is sufficiently stable and reflective for the intended purpose of a given embodiment of the invention. Where the method is used for optical switching, the reflective material may be selected from the group consisting of semi-conductive materials, polymeric materials and metals.

The reflective material may be in the form of a separate piece, such as a platelet, or in the form of a layer disposed upon the substrate such that the first and second beams strike the substrate directly from free space. As an alternative, and for methods used of optical switching and the like, the reflective material may be disposed upon the substrate such that the first and second beams strike the reflective material after passing through the substrate (i.e., the reflective material is placed on the back side of the substrate). This arrangement provides for a reflective surface that is protected from corrosive forces or physical damage, while having its reflective surface rendered more uniform owing to the smoothness of the substrate surface upon which it is deposited, which surface can be controlled through the selection of the substrate material.

The substrate material may be selected from any material that is sufficiently stable and, in applicable embodiments (such where the reflective material is placed on the back side of the substrate), sufficiently transmissive of the incident and reflected beams, as appropriate for the intended purpose of the method. Where the method is used for high performance optical processes such as optical switching, the reflective material may be selected from the group consisting of glass or transparent plastics, preferably selected to provide transparency and low scattering characteristics. In applications requiring high performance, it is preferred that the substrate material be sufficiently smooth, such as by using fused silica glass.

The method of the present invention may use a second beam of light that is pulsed at a frequency in accordance with those methods that may make advantageous use of the modulation or reduction of the second beam. This may be done through the use of any physical or electronic means known and appreciated in the art, and in light of the desired frequency of pulsing, the capabilities of the selected pulsing method, and the discreet separation of the pulses and/or the complete or incomplete negation or reduction of the second beam.

In another preferred embodiment particularly useful for high performance applications, at least one of the first beam, the second beam, and/or the reflecting beam is conducted by optical fibers.

It is also preferred that the first and second beams of light are laser light beams, which may be of the same or of different light frequencies. Most applications of the method of the present invention will find it advantageous to use light of different light frequencies in order to take advantage of filtering, and otherwise to be able to detect the light of one or more of the beams in exclusion of the other(s).

The first and second beams of light may be any light frequency appropriate to the application. For most industrial applications such for optical switching, these frequencies typically will be selected from the group consisting of visible, infrared and/or ultraviolet light, preferably laser light.

The method of the present invention also includes optionally placing a voltage through the reflective material, which has been found to enhance the effect of the second beam by further reducing the reflection of the second beam. This may be done through application of any appropriate electrical devices and contacts, and may include providing the reflective material with a semiconductive material or layer to govern the applied voltage. For instance, where the reflective material is placed on the back side of the material, it is most convenient to have the voltage supplied by contacts or devices applied to or providing an electrical influence to the surface opposite the reflective surface.

Method of Changing Reflection with Detection or Measurement

The method of the present invention also includes the optional step of detecting the change in the amount of light in the reflecting beam, which may be done through the use of any technique or device as appropriate to the application to which the method may be applied. This technique or device typically will be selected by consideration of sensitivity to and discretion of the detected beam. This may be done through the use of photodetectors and the like known and appreciated in the art, or that may hereafter be developed.

The method of the present invention also includes the optional step of additionally comprising producing a communication signal in response to the change in the amount of light in the reflecting beam. This may be done through the use of any technique or device as appropriate to the application(s) to which the method may be applied, such as through the use of digital or analog communication and signaling devices known and appreciated in the art, or that may hereafter be developed. This technique or device typically will be selected by consideration of the communication capabilities and requirements presented by each application, including sensitivity to and discretion of the detected beam.

The method of the present invention also includes a method of changing the amount of reflection of a beam with measurement the amount of change in the amount of light in the reflected beam. This method, in general terms, may be expressed as a method of changing the amount of reflected light from a beam of light, and measuring the amount of change in the reflected light, the method comprising: (a) providing a substrate bearing a film of a reflective material; (b) directing a first beam of light at a reflecting point upon the reflective material so as to create a reflecting beam therefrom; (c) directing a second beam of light at the reflecting point upon the reflective material so as to alter the amount of light in the reflecting beam; and (d) measuring the amount of change in the amount of light in the reflected beam.

This method also includes optionally placing a voltage through the reflective material, or otherwise provide an electronic influence to the reflective material to alter the available free electrons therein.

Apparatus for Changing Reflection

The present invention also includes an apparatus for changing the amount of light in a reflected beam of light, the apparatus comprising, in general terms: (a) a substrate bearing a film of a reflective material; (b) a source of a first beam of light directed at a reflecting point upon the reflective material so as to create a reflecting beam therefrom; (c) a source of a second beam of light directed at the reflecting point upon the reflective material and of sufficient energy to alter the amount of light in the reflecting beam; and (d) a measurement device for measuring the amount of change in the reflected beam.

The substrate bearing a film of a reflective material may be as described above. Typically, this arrangement will be secured to be free from corrosive forces, physical damage and vibration, in order to best assure high performance.

The reflective material may be disposed upon the substrate, such that the first and second beams strike the reflective material directly from free space, or the reflective material may be disposed upon the substrate so that the first and second beams strike the reflective material by first passing through the substrate.

The light source(s) for the first and second beam may independently be any appropriate source to bring about the desired effect as described above with respect to the method of the present invention, and depending upon the application of the apparatus. Some of the selection criteria naturally may be wavelength and beam strength, as well as compactness and ability to cooperate and be arranged with other parts of the inventive arrangement, such as the ability to be focused, redirected, shuttered and able to accommodate the use of supplementary transmission devices, such as mirrors, optical fibers, etc.

It is preferred that at least one of the first beam, the second beam, and the reflecting beam is conducted by optical fibers.

The light source(s) may be adapted to provide pulsing to the second beam of light.

The measurement device(s) may be any one or more devices or detectors appropriate to detect the change brought about in the reflected beam, as described above with respect to the method of the present invention, and depending upon the application of the use and design of the apparatus. These measurement device(s) may include any photo-detector device, such as a photodiode.

Method of Switching through Detection of or Reaction to Change in Reflection

The method of the present invention also includes a method of switching through detection of or reaction to a change in reflection. In general terms, this method comprises: (a) providing a substrate bearing a film of a reflective material; (b) directing a first beam of light at a reflecting point upon the reflective material so as to create a reflecting beam therefrom, the first beam bearing data in the form of light pulses; and (c) directing a second beam of light at the reflecting point upon the reflective material so as to alter the amount of light in the reflecting beam.

The switching method and apparatus of the present invention may be applied in communications systems using components of analog and digital communications systems as known and appreciated in those fields. For example, method and apparatus of the present invention may be used to provide switching in optical communication, systems by being able to impose high frequency changes in intensity into a communication optical beam.

The first beam applied in accordance with the present invention may be carried to and/or from the reflective material surface using optical fibers as is known and applied in the filed of optical communications.

The present invention may be used as an optical switch device which switches optical signals for WDM (Wavelength Division Multiplex) by selecting wavelengths of the optical signals. The optical communication network(s) can constitute a core to form a base of a communication network, and may use WDM techniques to transmit a plurality of signals concurrently through a single optical fiber by multiplexing light having different wavelengths (colors). Accordingly, the method and apparatus of the present invention may be applied to provide an optical switch for one or several light beams of various wavelengths.

Method of Providing a Pulsed Optical Signal through Change in Reflection

The present invention also includes a method of providing a pulsed optical signal by changing the amount of reflected light from a beam of light, the method comprising: (a) providing a substrate bearing a film of a reflective material; (b) directing a first beam of light at a reflecting point upon the reflective material so as to create a reflecting beam therefrom; (c) directing a pulsed second beam of light at the reflecting point upon the reflective material so as to create pulses in the amount of light in the reflecting beam thereby creating a pulsed reflecting beam; and (d) transmitting the reflecting beam along an optical conduit. The optical conduit may comprise optical fibers, and may be used in conjunction with other photoconductive and optical means used in the art. It is preferred that the method additionally comprises receiving the reflected beam at a location remote from the reflective point, such as may be done in accordance with optical transmission of data over typical distances over which such transmissions are made.

Apparatus for Providing a Pulsed Optical Signal

Another aspect of the present invention is an apparatus for providing a pulsed optical signal by changing the amount of reflected light from a beam of light, the apparatus comprising: (a) a substrate bearing a film of a reflective material; (b) a source of a first beam of light directed at a reflecting point upon the reflective material so as to create a reflecting beam therefrom; (c) a source of a second beam of light directed at the reflecting point upon the reflective material and of sufficient energy to alter the amount of light in the reflecting beam; and (d) an optical conduit for transmitting the reflecting beam to a location remote from the reflecting point.

Multi-Cell Apparatus for Providing a Pulsed Optical Signal

Still another aspect of the present invention is a multi-cell apparatus for changing the amount of reflected light from a beam of light, the apparatus comprising: (1) a first optical cell comprising: (a) a first substrate bearing a film of a first reflective material; (b) a source of a first beam of light directed at a first reflecting point upon the first reflective material so as to create a first reflecting beam therefrom; (c) a source of a second beam of light directed at the first reflecting point upon the reflective material and of sufficient energy to alter the amount of light in the first reflecting beam; and (2) a second optical cell comprising: (a) a second substrate bearing a film of a second reflective material, the first reflecting beam directed at a reflecting point upon the second reflective material so as to produce a second reflective beam; and (b) a source of a third beam of light directed at the reflecting point upon the second reflective material and of sufficient energy to alter the amount of light in the second reflecting beam.

Optical Logic Circuits and Devices

The present invention also includes devices for performing optical logic operations, including those used parallel architectures.

Optical logic devices of the present invention may be produced using optical switching cells of the type described herein to construct logic devices using positive and negative signs of the modulation amplitude to correspond to positive and negative logic, in accordance with known arrangements and circuitry.

BRIEF DESCRIPTION OF THE DRAWINGS

FIG. 3 is a graph showing switch contrasts versus applied voltage (film-side), in accordance with one embodiment of the present invention.

FIG. 4 is a graph showing switch contrasts versus applied voltage (glass-side), in accordance with another embodiment of the present invention.

DETAILED DESCRIPTION OF THE PREFERRED EMBODIMENT

In accordance with the foregoing summary, the following present a description of a preferred embodiment of the present invention, currently considered to be the best mode thereof.

Figure 1:
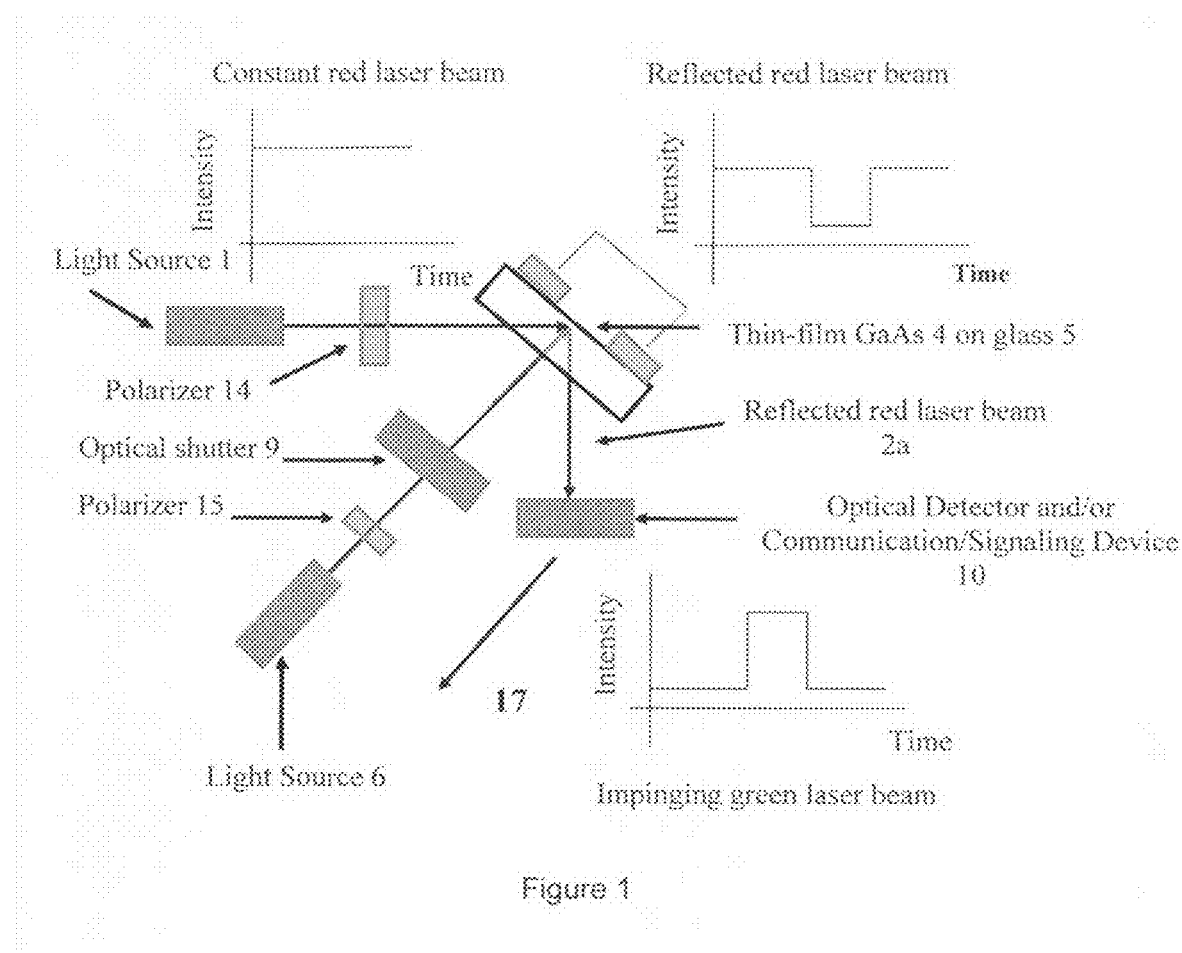
FIG. 1 shows a schematic of an apparatus that produces the optical switching process, in accordance with one embodiment of the present invention.

FIG. 1 shows a schematic of a basic arrangement for a switch in accordance with one embodiment of the present invention including an apparatus that produces the optical switching process in accordance with one embodiment of the present invention. FIG. 1 shows generally the switching concept of the present invention. By means of an optical shutter, the irradiation of the green laser is turned on and off causing a digital decrease and increase, respectively, in the transmission of the red laser light.

FIG. 1 shows a first light source 1 generating a first light beam 2. The first light beam 2 is reflected of a reflective material surface 3 which as shown is a thin film GaAs layer 4 on a transparent substrate 5 (i.e., fused silica glass; in this embodiment the thin film GaAs layer 4 is placed on a side of the fused silica glass opposite the first light source 1 such that the first light beam 2 passes through the transparent glass substrate 5 before reflecting from the reflective material surface 3). This embodiment provides the advantage that the first light beam 2 does not pass through the thin film GaAs layer 4, which would reduce or scatter it.

FIG. 1 also shows second light source 6 generating a second light beam 7. The second light beam 7 is directed at the reflective material surface 3 and at the point where first light beam 2 reflects from the reflective material surface 3 (i.e., reflecting point 8). The second light beam 7 is optionally controlled by a device such as an optical shutter 9 which may be used to pulse the second light beam 7.

After reflecting from the reflective material surface 3, the reflected first light beam 2a emerges from the transparent glass substrate 5. The change in the amount of light in first light beam 2a after reflection, as compared to that in first light beam 2a prior to reflection, may then be detected and/or measured, such as by an optical detector and/or a communication/switching/signaling device 10. Where the optical detector and/or communication/signaling device 10 comprises a communication or signaling device, such a device may further generate further communication or signals for transmission to telephone or internet communications networks (as indicated by arrow 17), as are known and used in the telecommunications fields.

This embodiment of the present invention may be carried out by intersecting continuous wavelength (cw) laser emissions at 532 nm and 633 nm directed at a reflecting point of a thin-film GaAs and CdS on glass, prepared as described in Erlacher A. and Ullrich B. *Semicond. Sci. Technol.* 19 L9 (2004) and Erlacher A., Miller H. and Ullrich B. *J. Appl. Phys.* 95 2927 (2004), hereby incorporated herein by reference.

FIG. 1 also shows how, by means of an optical shutter or other equivalent means, a digital decrease and increase, respectively, in the reflected first beam (e.g., a red laser light) is caused by the second beam (e.g., a green laser light) as it is pulsed or turned on and off. This may be done for instance by any appropriate physical or electronic means for causing alternation in the green laser light beam, such as optical shutters to block it or change its direction, or electronic switching to turn it on or off.

Figure 2:
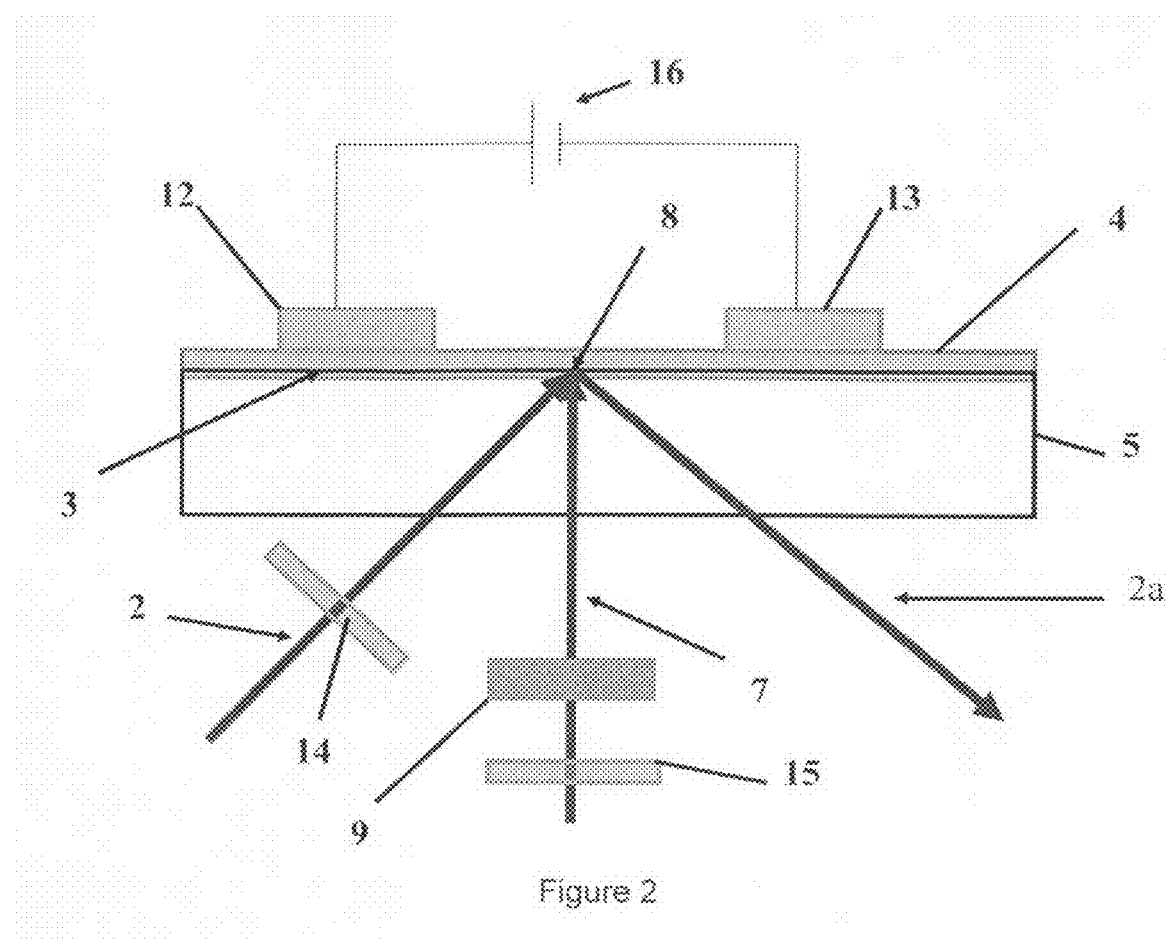
FIG. 2 shows a detailed schematic of an apparatus shown in FIG. 1 that produces the optical switching process, in accordance with one embodiment of the present invention.

FIG. 2 shows a detailed schematic of an apparatus shown in FIG. 1 that produces the optical switching process, in accordance with one embodiment of the present invention. The same reference numerals are used to refer to those portions shown in FIG. 1. FIG. 2 shows in greater detail the first light beam 2 reflecting off reflective material surface 3 which as shown is a thin film GaAs layer 4 on a transparent substrate 5 (i.e., fused silica glass; in this embodiment the thin film GaAs layer 4 is placed on a side of the fused silica glass opposite the first light source 1 such that the first light beam 2 passes through the transparent glass substrate 5 before reflecting from the reflective material surface 3). FIG. 2 shows in greater detail the use of optional electrical contacts 12 and 13 for placing a voltage across a region of thin film GaAs layer 4 in the area of reflective material surface 3 comprising reflecting point 8. The contacts are provided with a voltage source such as a battery or other potential 16.

The imposition of a voltage across this region causes a modulation in the suppression of light in the reflected light beam 2a such that, at a threshold voltage, the amount of light in the reflected light beam 2a actually increases upon co-irradiation of the reflecting point 8. This effect allows for further imposition of data into the reflected light beam 2a.

Instead of or in addition to the imposition of a voltage across a region of thin film GaAs layer 4 in the area of reflective material surface 3 comprising reflecting point 8, one may optionally alter the polarity of the first light beam 2 and/or the second light beam 7. It has been found that altering the relative polarity of the first light beam 2 with respect to the second light beam 7 in turn alters the degree of change made in the reflectance of the first light beam 2 by the second light beam 7. This may be done by any appropriate means or methods known in the art, including using a polarizer 14 in the path of the first light beam 2 and/or by using a polarizer 15 in the path of the second light beam 7.

Figure 2A:
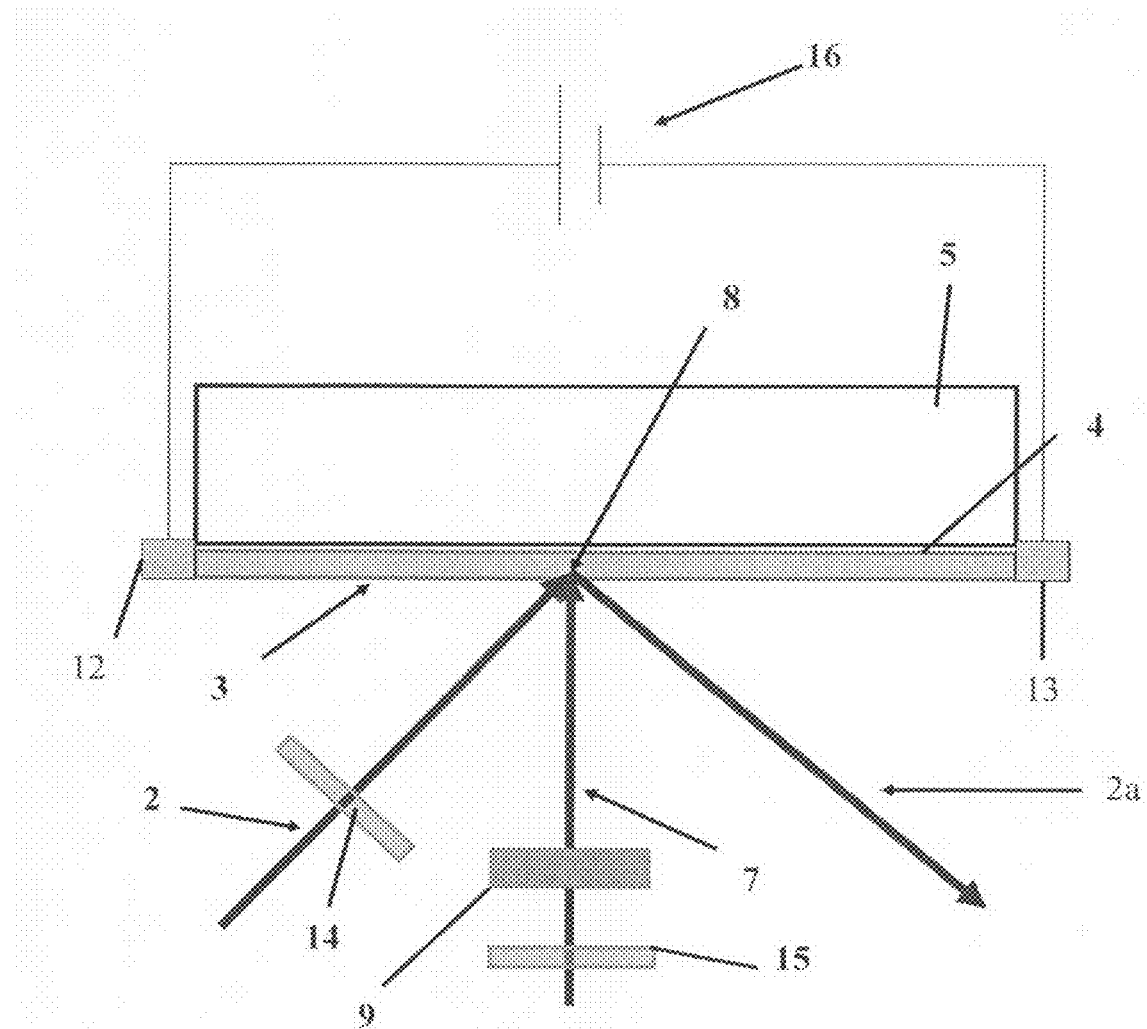
FIG. 2a shows a detailed schematic of an apparatus that is a variation of that shown in FIGS. 1 and 2 and that produces the optical switching process, in accordance with another embodiment of the present invention.

FIG. 2a shows a detailed schematic of an apparatus that is a variation of that shown in FIGS. 1 and 2 and that produces the optical switching process, in accordance with another embodiment of the present invention. FIG. 2a shows a detailed schematic of an apparatus that may be used in accordance with the device shown in FIG. 1 that produces the optical switching process. The same reference numerals are used to refer to those portions shown in FIGS. 1 and 2. The detailed schematic of FIG. 2a shows an example of a reflective material and substrate wherein the first light beam 2 reflecting off reflective material surface 3 which as shown is a thin film GaAs layer 4 on a transparent substrate 5 (i.e., fused silica glass; in this embodiment the thin film GaAs layer 4 is placed on a side of the fused silica glass facing the first light source 1 such that the first light beam 2 encounters the reflective material surface 3 directly from free space).

The present invention is considered an improvement over previous methods in that it allows the imposition of control over the changes in intensity in the first beam without having the first beam pass though the deposited thin-film GaAs and CdS on glass; i.e., referred to as the "transmission mode" as compared to the "reflection mode" of the present invention. As described above, this may be brought about by the intersection of a second beam at the reflecting point, which effect may be optionally modulated by the imposition of a potential in the region of the reflecting point, and/or through the change in the relative polarity of the two beams. The devices and methods of the present invention may be used in accordance with devices or arrangements wherein the operation is in the transmission mode.

In order to prepare an apparatus in accordance with this embodiment of the present invention, two films may be formed in vacuum ($10^{-6}$-$10^{-7}$ Torr) with pulsed-laser deposition (PLD) employing the second harmonic emission of a Nd:YAG laser (6 ns, 10 Hz) at 532 nm. The target was p-type zinc (Zn) doped ($10^{19}$ cm$^{-3}$) GaAs and n-type silicon (Si)

doped ($10^{18}$ cm$^{-3}$) GaAs and the substrate used was fused silica glass, which was not heated during the film deposition. The substrate was oppositely mounted to the target at a distance of 6 cm. In order to deposit the GaAs:Zn and GaAs:Si films the target material was ablated with a laser fluence of 0.71-0.76 J cm$^{-2}$ and 0.71-0.81 J cm$^{-2}$ for 60 and 40 minutes resulting in a film thickness of 0.66 µm and 0.35 µm, respectively. The film thickness was calculated using the Fabry-Perot fringes in the high transmissive range of the films.

Switching experiments were performed at room temperature using the apparatus according to FIG. 1. Two cw laser lines at 532 nm and 633 nm of a 50 mW and 20 mW laser, respectively, were guided to the same spot by keeping the intensities on the order of 10 W/cm$^2$. By means of an optical shutter, the green laser was switched on and off causing a digital decrease and increase, respectively, in the reflected signal of the red laser. The change in the reflected beam was measured with a silicon photodiode connected to an ammeter.

FIG. 3 is a graph showing switch contrasts versus applied voltage (film-side; as exemplified by FIG. 2a), in accordance with one embodiment of the present invention. This graph shows the switching of 632 nm light through use of 532 nm light with bias on the film side. This graph shows the contrast between switching conducted in the reflection mode as in the present invention and that done in the transmission mode. The graph shows that the reflectance switch contrast percent remains relatively constant over a range of applied voltage.

FIG. 4 is a graph showing switch contrasts versus applied voltage (glass-side; as exemplified by FIG. 2), in accordance with another embodiment of the present invention. This Figure demonstrates the switching behavior of the apparatus in reflection mode and transmission mode, when an applied voltage is provided to the film on the glass side, and demonstrates the better switching performance of the use of the film on the glass side, and the ability of the applied voltage to change the operational mode of the device when applied as an optical switch.

Hybrid architectures are important for the transfer of electronic information into an optical data stream. Hybrid LC was investigated with the configuration shown in FIG. 1 and FIG. 2. The experiments were carried out in reflection geometry. For the "write" beam the emission of an Argon-Krypton laser at 530.0 nm was used. The "read" beam was provided from a He—Ne laser emitting at 632.8 nm. The power of the lasers was 23 mW and 14 mW, respectively, whereas the impinging laser intensities did not exceed 10 W cm$^{-2}$. The rear interface of thin-film GaAs on glass was excited that the laser spots met at the gap between two vacuum evaporated Al contacts, which were deposited on the GaAs film. In order to apply a bias, the contacts have been connected to a direct current high-voltage power supply. The interruption of the write beam was achieved by means of an optical shutter. The switching at 0 V and 600 V, i.e., all-optical and hybrid mode are shown in FIGS. 3 and 4, respectively. The results reveal a tremendous impact of the applied voltage and confirm our previously proposed model [7] which explained the LC switch by transferring charges out of trap states into the initial state of the read beam transition. Applying an electric field, the switching direction is inverted with respect to the field-free switch because the excited electrons rather contribute to the photocurrent in the film than to recombine, and therefore, lowering the electron density for potential absorption transitions and the film becomes more transparent when the write beam is on.

Figure 5:
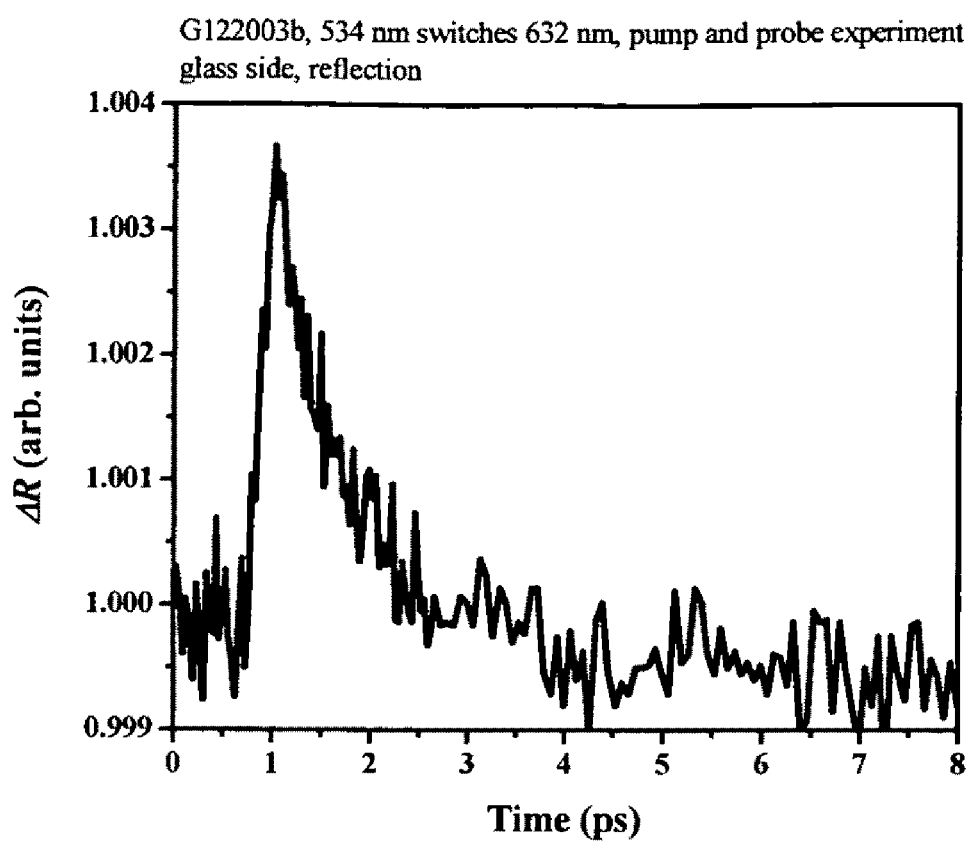
FIG. 5 is a graph showing reflection switch kinetics ($\Delta R$), 534 nm switches 632 nm switch versus time in picoseconds (ps), in accordance with another embodiment of the present invention.

FIG. 5 is a graph showing reflection switch kinetics (ΔR), 534 nm switches 632 nm switch versus time in picoseconds (ps), in accordance with another embodiment of the present invention.

Figure 6:
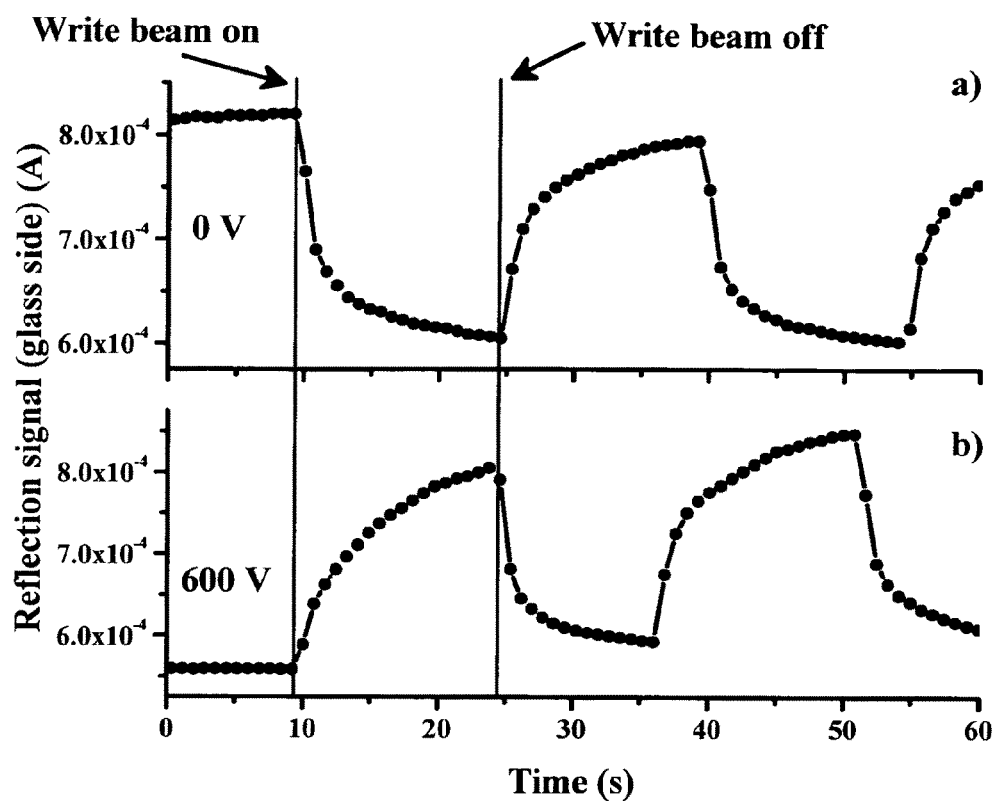
FIG. 6 is a graph showing a reflection switch with and without applied bias (glass side).

FIG. 6 is a graph showing the reflection mode switching with and without applied bias (glass side). This Figure demonstrates the switching behavior of the apparatus in reflection mode, when an applied voltage is provided to the glass side.

In summary, it has been shown that pulse laser deposited (PLD) GaAs on glass has been used as a reflection interface for two cw laser beams at 532 nm and 633 nm. This allows for the creation of a photonic switch at 633 nm. The present invention thus provides an electronic switch in the reflection mode that makes possible the operation of photonic gates in the ps regime. Due to simplicity, low-power consumption and the prospect of ps switching, reflective laser crossing has the potential for products used in mass-market photonics.

Another embodiment of the present invention involves photonic THz laser digitizing with thin-film GaAs on glass. The GaAs/glass interface of this embodiment of the present invention can be used for an effective all-optical digitizer (35%) of transmitted and reflected laser beams. The films have been formed with pulsed-laser deposition. The switching principle is extremely straightforward: two (or more) laser rays were crossed at the same spot on the interface. Most of the experiments have been carried out with red ("read") and green ("write") laser rays, although other wavelength/functionality combinations may be used. The information of the write beam is transferred to the read beam by means of alteration of the electronic state of the interface. Pump-probe experiments revealed that the absorption change, i.e., the alteration of the electronic state, takes place within a few picoseconds. Therefore, logic operations in the THz range become feasible. In addition, NOR and NAND gate realizations with laser crossing are possible. Besides the formation of smart all-optical cross-links, all optical computing is a further application of laser crossing. The present invention can be applied to create logic circuits and other similar components for computing in optical mode as will be apparent from the demonstration of the present invention in switching.

Based on the unmatched simplicity of the switch realization, switching speed, and the fairly low material quality demands, laser crossing in thin-film GaAs has the potential to be used in future optical networks. This embodiment illustrates the hybrid mode with laser crossing in thin-film GaAs/glass interfaces.

Sample Preparation and Experiment

Thin-film GaAs on glass formed by ablating the material with 6 ns pulses with 10 Hz repetition rate at 532 nm or 1064 nm of a Nd:YAG laser. The target was p-type (1019 cm-3) GaAs:Zn or n-type (1018 cm-3) GaAs:Si. The deposited film thicknesses were around 0.5 µm. More details about the pulsed-laser deposition (PLD) system have been described elsewhere.[21] The switching experiments were carried out at room temperature with continuous wavelength (cw) green and red laser emissions of at most 23 mW and 14 mW, respectively, exposing the films to low intensities of typically 10 W cm-2. The digitizing was recorded with a Si-photodiode connected to an amperemeter.

Realization of NAND and NOR Gates With Laser Crossing

Figure 7:
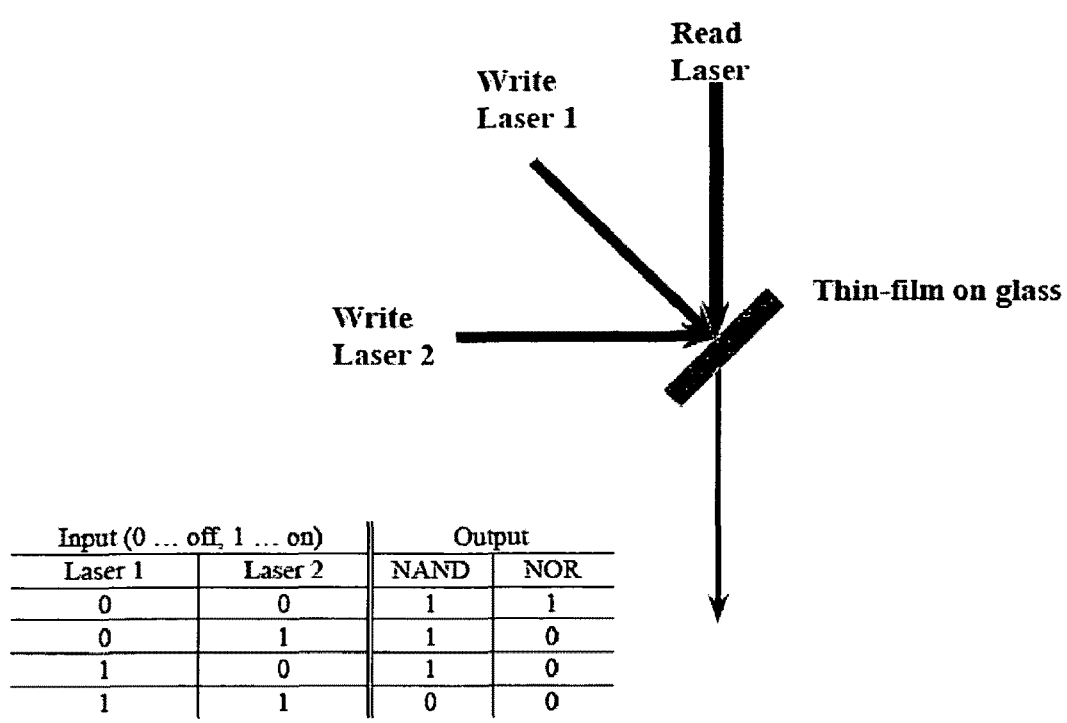
FIG. 7 shows a schematic of an experimental setup to demonstrate NAND and NOR gates using laser crossing. The truth table for the transmitted red read laser beam is depicted as well, in accordance with one embodiment of the present invention.
Figure 8:
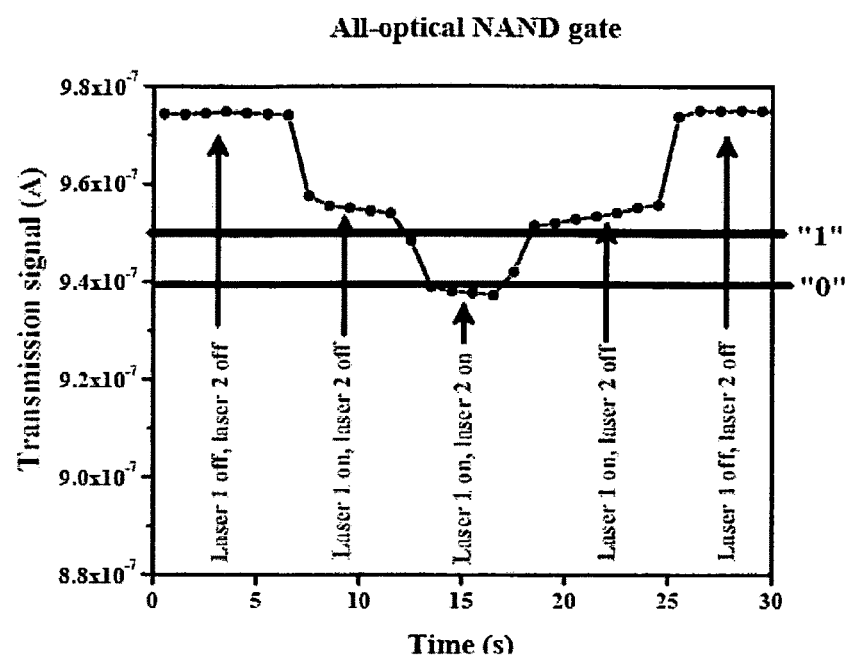
FIG. 8 shows a graph of Transmission Signal (A) vs. Time (s), demonstrating an all-optical NAND gate by crossing of three laser beams.
Figure 9:
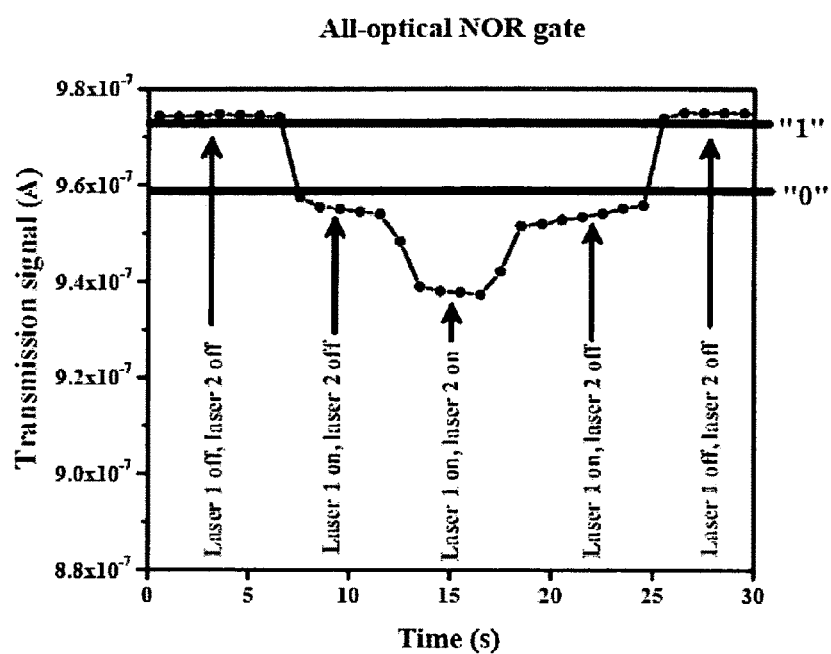
FIG. 9 shows a graph of Transmission Signal (A) vs. Time (s), demonstrating an all-optical NOR gate by crossing of three laser beams. The measurement is the same as in FIG. 8.

FIG. 7 shows schematically the experimental arrangement for the NAND and NOR gate realization. The setup consisted of three laser beams. Two of them were the so-called write laser beams at 514.5 nm with a power of 7 mW provided from an Argon and an Argon-Krypton laser. For the read beam the 10 mW emission of a He—Ne laser at 632.8 nm was employed. FIGS. 8 and 9 show the results. Notably, both gates are realized with the same measurement. The desired gate logic depends on the appropriate definition of the "on" and "off" states. Furthermore, by combining several NAND or NOR gates other logic gates, e.g. OR, AND, XOR, etc., can be constructed. As may be appreciated by those in the field of logic device deign, the definition of positive and negative logic may be reversed from that shown in the drawings herein as the logic may be designed as desired.

Response Time of Laser Crossing

Figure 10:
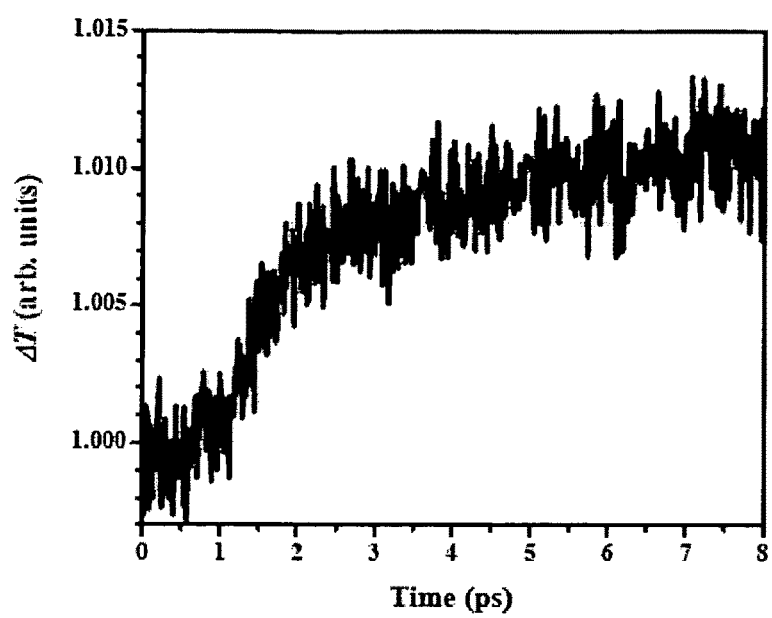
FIG. 10 shows a graph of transmission kinetics ($\Delta T$) of thin-film GaAs:Si on glass at 630 nm.
Figure 11:
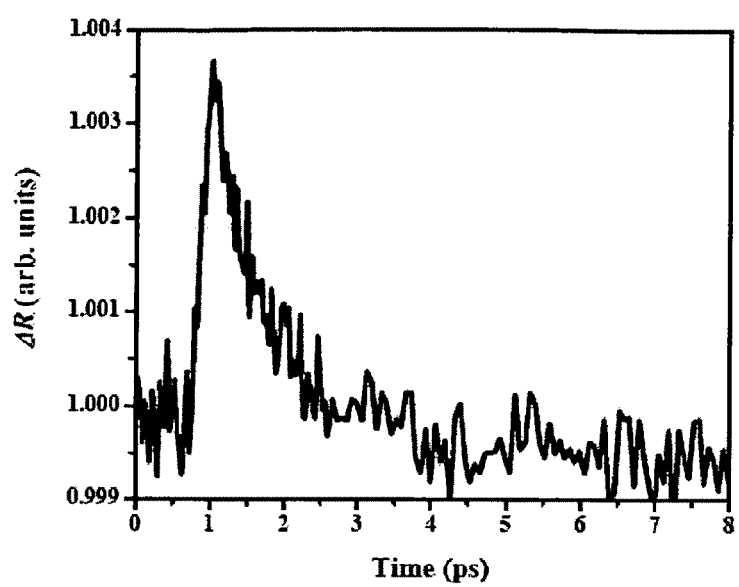
FIG. 11 shows a graph of reflection kinetics ($\Delta R$) at 630 nm of the GaAs:Zn/glass interface.

A very important aspect of an optical switching apparatus is the switching speed of an implemented concept. In order to challenge electronics, response and recovery times in picoseconds are required. The speed of the absorption change has been measured with pump-probe experiments. For this purpose, the film was excited with ultrafast ($\leqq 100$ fs) pump laser pulses with 1 kHz repetition rate at 534 nm. A white light continuum was used to probe the temporally resolved response of the film. FIGS. 10 and 11 show the kinetics for thin-film GaAs:Si and GaAs:Zn formed at 532 nm and at 1064 nm for the common film transmission, and the reflection from the GaAs/glass interface, respectively. In order to make sure that the glass substrate does not influence the measurements in FIG. 11, pump-probe experiments were performed with glass alone but no kinetic response was observed.

Clearly, the GaAs/glass interface shows improved temporal features. The switch-on time is below 500 fs and the recovery takes place within 1 ps, both of which may be considered a preferred parameter of the optical switch of the present invention. Without overstretching the envelope, based on the result shown in FIG. 11, LC at the rear interface of thin-film GaAs on glass has the potential for THz photonics.

Hybrid Laser Crossing (LC)

Figure 12:
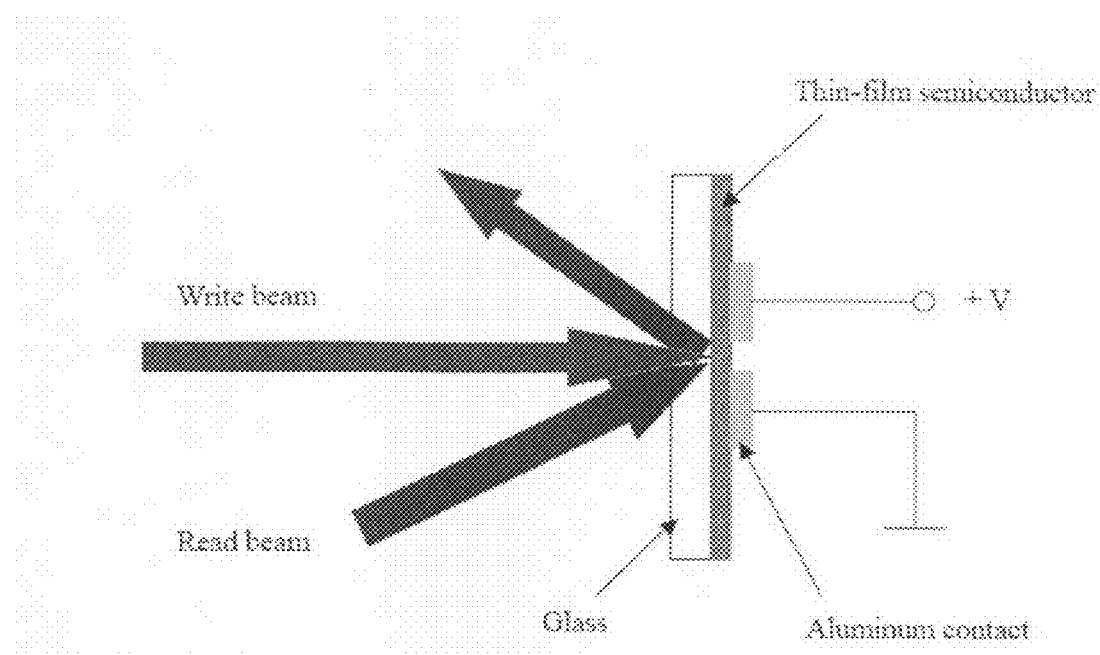
FIG. 12 shows an experimental arrangement for measuring the all-optical and hybrid mode of the GaAs/glass interface in reflection geometry, in accordance with one embodiment of the present invention.
Figure 13:
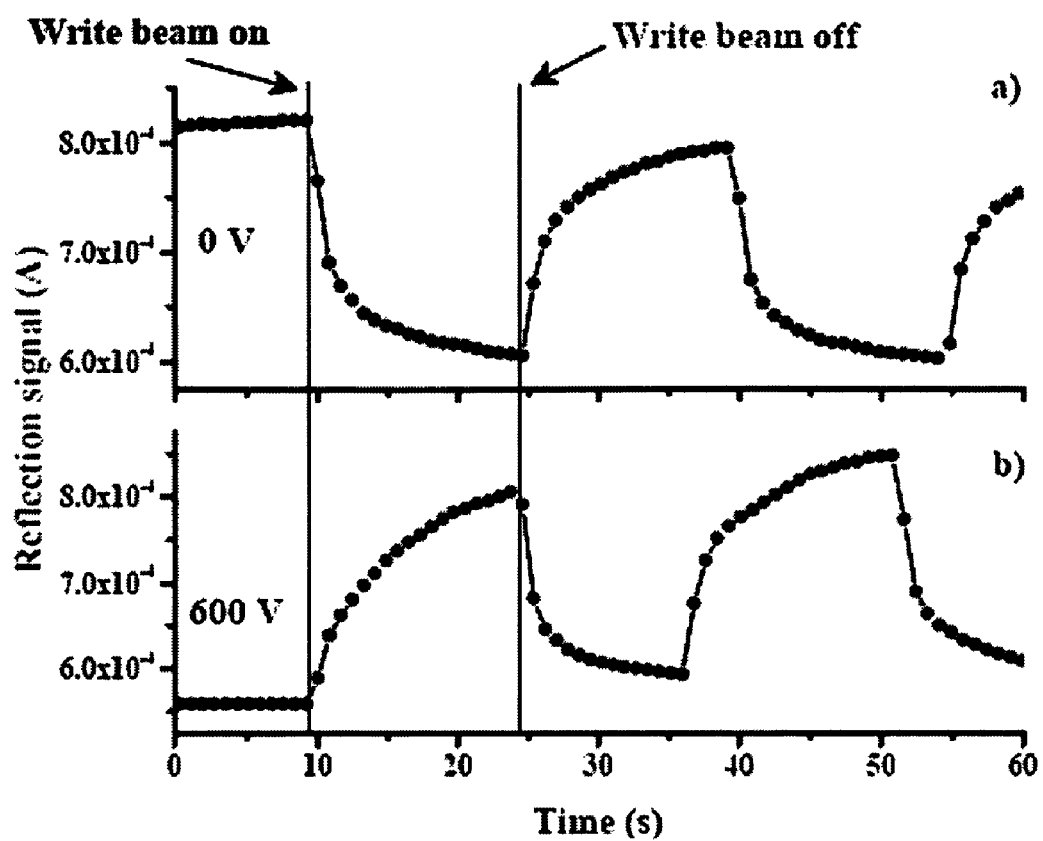
FIG. 13 shows graphs of ($a$) All-optical mode at 0 V and ($b$) hybrid mode with a bias of 600 V. The switching amplitude in FIG. 13($a$) is 21% and in FIG. 13($b$) 35%. The experiments have been carried out according to the schematic shown in FIG. 12. The y-axis shows the change in the photocurrent of a Si-photodiode, which was facing the reflected read beam.

Hybrid architectures are important for the transfer of electronic information into an optical data stream. Hybrid LC was investigated with the configuration shown in FIG. 12. The experiments were carried out in reflection geometry. For the write beam the emission of an Argon-Krypton laser at 530.0 nm was used. The read beam was provided from a He—Ne laser emitting at 632.8 nm. The power of the lasers was 23 mW and 14 mW, respectively, whereas the impinging laser intensities did not exceed 10 W cm-2. The rear interface of thin-film GaAs:Zn on glass was excited such that the laser spots met at the gap between two vacuum evaporated Al contacts, which were deposited on the GaAs film. In order to apply a bias, the contacts were connected to a direct current high-voltage power supply. The interruption of the write beam was achieved by means of an optical shutter. The switching at 0 V and 600 V, i.e., all-optical and hybrid mode are shown in FIGS. 13(a) and 13(b), respectively. The results reveal a tremendous impact of the applied voltage and confirm our previously proposed model [20], which explained the LC switch by transferring charges out of trap states into the initial state of the read beam transition. Applying an electric field, the switching direction is inverted with respect to the field-free switch because the excited electrons rather contribute to the photocurrent in the film than to recombine, and therefore, lowering the electron density for potential absorption transitions and the film becomes more transparent when the write beam is on.

The present invention demonstrates the realization of NAND and NOR gates with LC and revealed that the GaAs/glass interface exhibits a considerably faster temporal characteristic than the GaAs film itself. Furthermore, the hybrid mode of LC is demonstrated for the first time. By pointing to the importance of the available electron density for the absorption, the hybrid mode results confirm the electronic origin of the LC switch. The present invention demonstrates that application of semiconductor/glass interfaces for optical and hybrid switching purposes. The rear interface reveals better contrast and faster recovery times since more electronic states are provided to optically induce an electronic change in the sample.

The present invention also applies glass/GaAs interfaces as effective photonic switch media. As an example, all-optical and hybrid red laser reflection modulations have been achieved by altering the electronic state of the interface with a green laser. The present invention thus allows for the change from negative to positive logics solely by applying an electric field. In addition, the present invention provides glass/GaAs interfaces that exhibit rise and recovery times in the femtosecond (fs) regime.

In contrast to the prior art represented by the concepts described in the "classical" literature [22-24], and without going distinctly along with currently discussed optical techniques in Refs. [34-38], the present invention includes all-optical operations via laser crossing (LC) in thin-film semiconductors (CdS, GaAs, and InP) on glass [39-43]. The main advantageous difference between LC and other concepts is its low-cost realization potential due to extreme straightforwardness of the basic principle. The present invention employs, as an example, a glass/GaAs interface as an active LC medium that may be used for all-optical applications, as well as for hybrid computing architectures.

Figure 14:
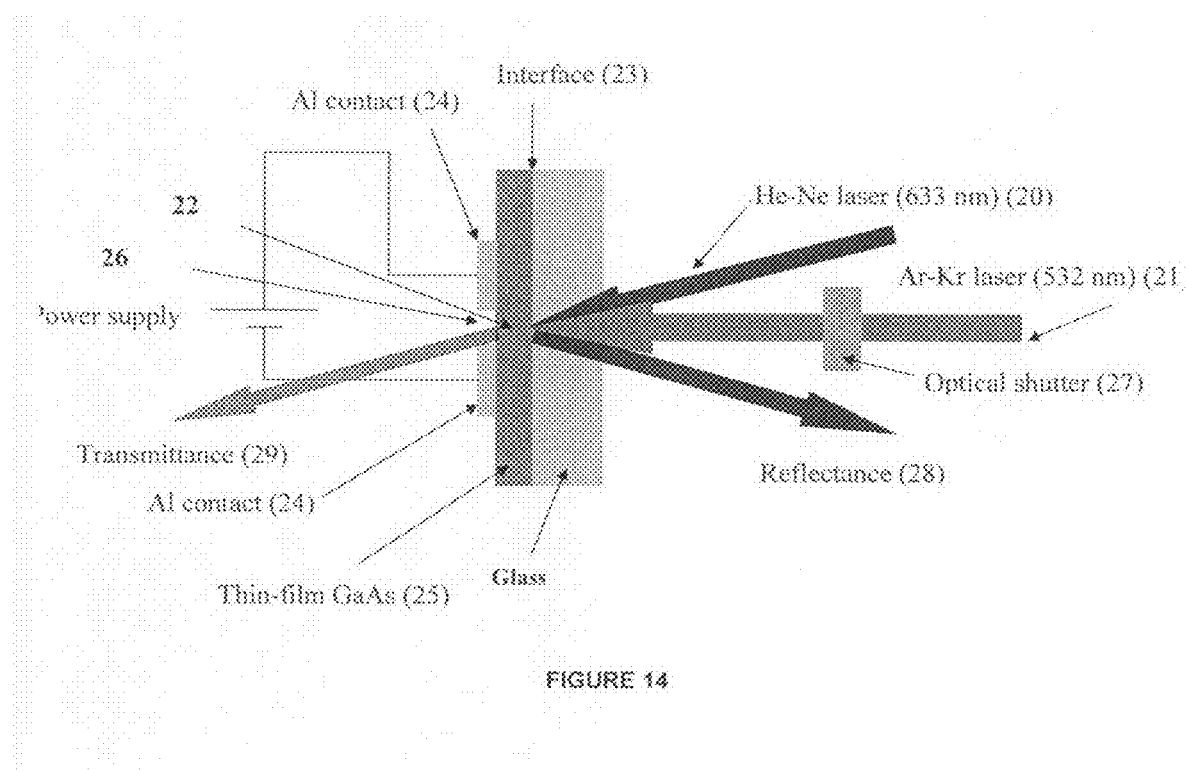
FIG. 14 shows an experimental arrangement for measuring the all-optical and hybrid mode of the GaAs/glass interface in both reflection and transmission modes, in accordance with another embodiment of the present invention.

The schematic of the experiment is shown in FIG. 14. Red (633 nm) 20 and green (530 nm) 21 (controlled by optical shutter 27) continuous wavelength (cw) emissions of a 10 mW He—Ne laser and 20 mW Ar—Kr laser, respectively, were crossed in one spot 22 at the glass/GaAs interface 23 opposite to the opening of Al contacts 24, which have been evaporated on the film surface 25. The gap 26 between the contacts was about 1 mm and the impinging laser intensities were kept below 10 W cm$^{-2}$. The arrangement of the laser rays permitted the measurement of reflection and transmission of the red laser as a function of the on-off sequence of the green laser with the additional option to apply an electric field across the illuminated film area. The reflected 28 and transmitted 29 signals of the He—Ne laser were measured with Si photodiodes, which were connected to ampere meters. The on-off cycling of the Ar—Kr laser beam was achieved by means of an optical shutter.

The GaAs film was formed with pulsed-laser deposition (PLD) in vacuum ($10^{-3}$ Pa) by employing the fundamental emission (1064 nm) of a Nd:YAG laser (6 ns, 10 Hz). The target was GaAs:Zn (doping concentration $10^{19}$ cm$^{-3}$) and the film was ablated with a fluence of about 0.8 J cm$^{-2}$ to be 0.5 μm thick. The distance between target and fused silica glass substrate, which was not heated during the deposition, was 6 cm. The PLD setup used was described in detail in a previous publication [44].

The present invention proceeds from photoluminescence (PL) measurements rather than from previous switching experiments. Comparing the PL excited at the surface and through the glass substrate, it was found that PLD CdS on glass exhibits an increased absorption at the CdS/glass interface with respect to the rest of the film [45, 46]. The present invention demonstrates that the same was true for PLD GaAs on glass, and that enhanced LC modulation amplitudes are possible by using the rear reflection of the film, which is demonstrated as follows. The invention may also be produced by using CdS or InP on glass. The device may operate in the transmission mode using either GaAs, CdS or InP, for instance.

Through FIG. 14, one may also appreciate that the devices in accordance with the present invention may be operated in both a transmittance and reflection mode, either alternatively or simultaneously, where the application warrants.

Figure 15:
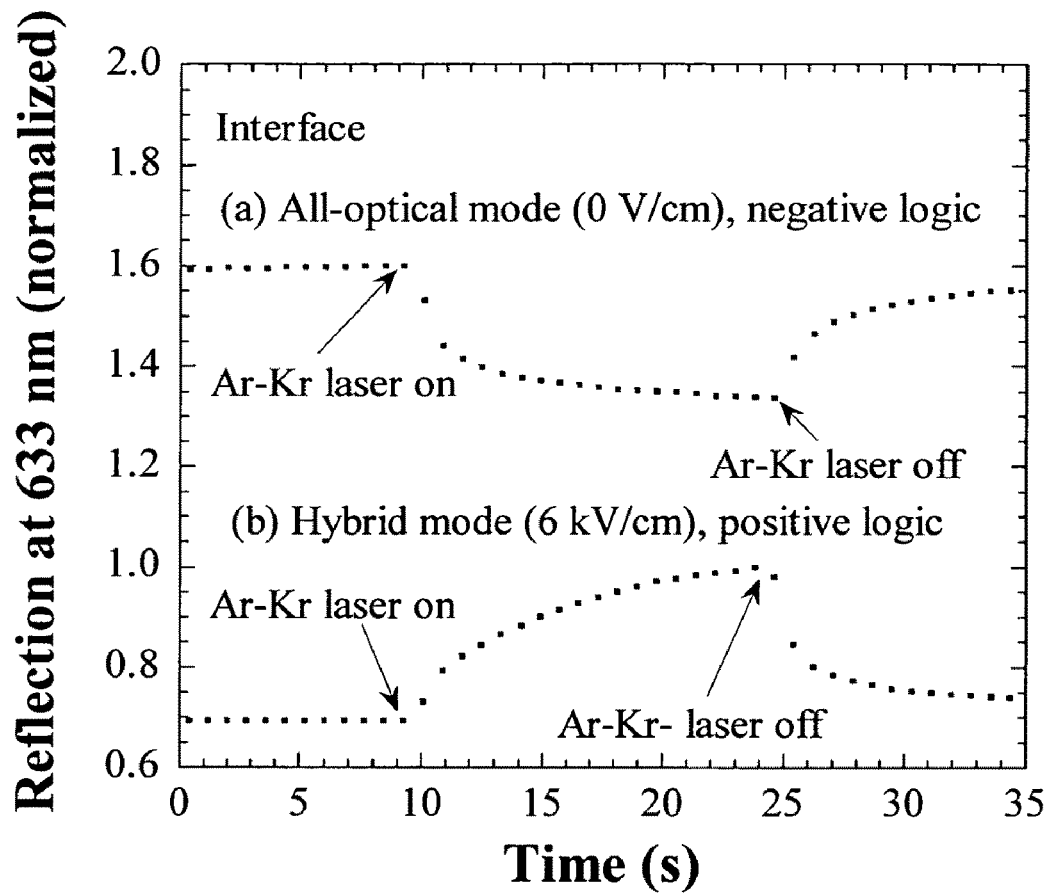
FIG. 15 shows a graph demonstrating the modulated He—Ne laser reflection caused by the impinging Ar—Kr laser beam of reflection kinetics ($\Delta R$) at 630 nm of the GaAs:Zn/glass interface, in accordance with one embodiment of the present invention.

FIG. 15 shows the modulated He—Ne laser reflection caused by the impinging Ar—Kr laser beam. The measurements have been performed at room temperature (a) without and (b) with applied electric field of 6 kV/cm. The achieved modulation amplitudes are up to 35% and, notably, both responses are almost perfectly inverted. According to our chosen definition, the modulation flip refers to the cross-over between negative (all-optical) and positive (hybrid) logics. The ability to invert logic operations by simply applying an electric field is one of the novel aspects of the present invention as applied to the field of digitizing devices. This is one of the appealing capabilities of the optical switches of the present invention. Accordingly, this demonstrates that optical logic devices may be produced using optical switching cells of the type described herein to construct logic devices using positive and negative signs of the modulation amplitude to correspond to positive and negative logic, in accordance with known arrangements and circuitry.

In previous papers [40, 41], the driving principle of LC underlying the alteration of the local electronic state of the film was demonstrated. Thus, the flip of the modulation in FIG. 15 is caused by the reduction of the electron number available for absorption, i.e., with growing electric field more and more electrons join the circulation of the photocurrent rather than to maintain the matrix element of the absorption coefficient due to recombination into the valence band.

Figure 16:
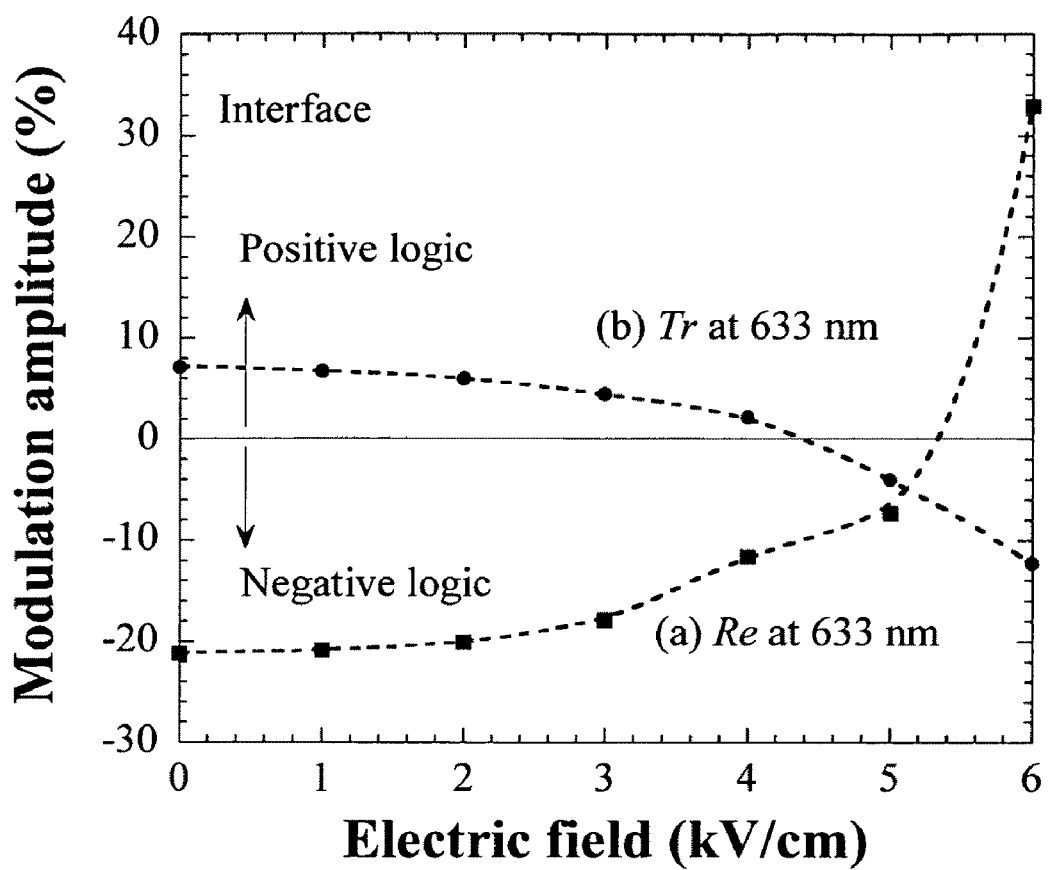
FIG. 16 shows a graph demonstrating the dependence of the modulation amplitude on the applied electric field of the reflected and transmitted signal of the He—Ne laser. Positive and negative signs of the modulation amplitude correspond to positive (as in FIG. 15($b$)) and negative (as in FIG. 15($a$)) logic.

As a consequence, the sample becomes more transparent and the modulation switches up. FIG. 16 reveals the dependence of the modulation amplitude on the applied electric field of the reflected and transmitted signal of the He—Ne laser. Positive and negative signs of the modulation amplitude correspond to positive (as in FIG. 15($b$)) and negative (as in FIG. 15($a$)) logic.

Figure 17:
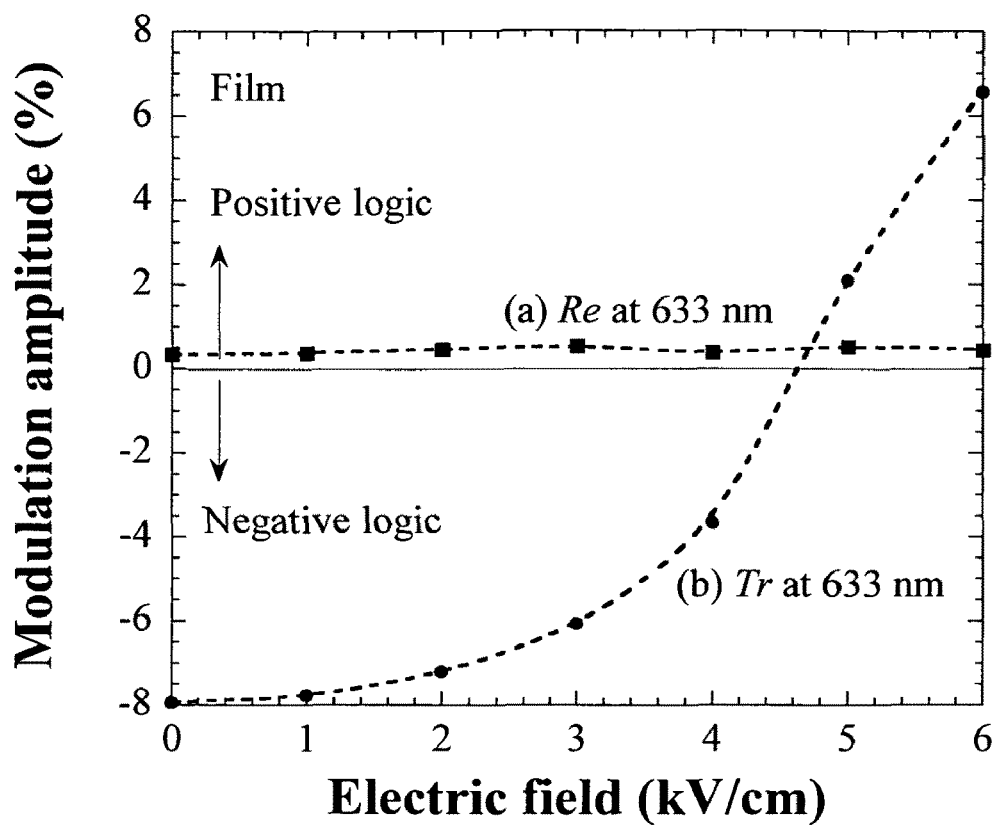
FIG. 17 shows a graph of corresponding laser crossing (LC) results for the thin-film in accordance with the prior art.

For comparison, FIG. 17 shows the corresponding LC results for the thin-film, i.e., the film side was excited as in Refs. 40 and 41. The film reflection exhibits almost no modulation, whereas the maximum of the transmission modulation is comparable with the results in FIG. 16. As expected from the PL results, reflective LC at the interface exhibits enhanced modulation capabilities. Furthermore, from the viewpoint of device engineering, with the employment of the reflected beam the desired fan-out is easier to achieve than with the much weaker transmitted signal.

Figure 18:
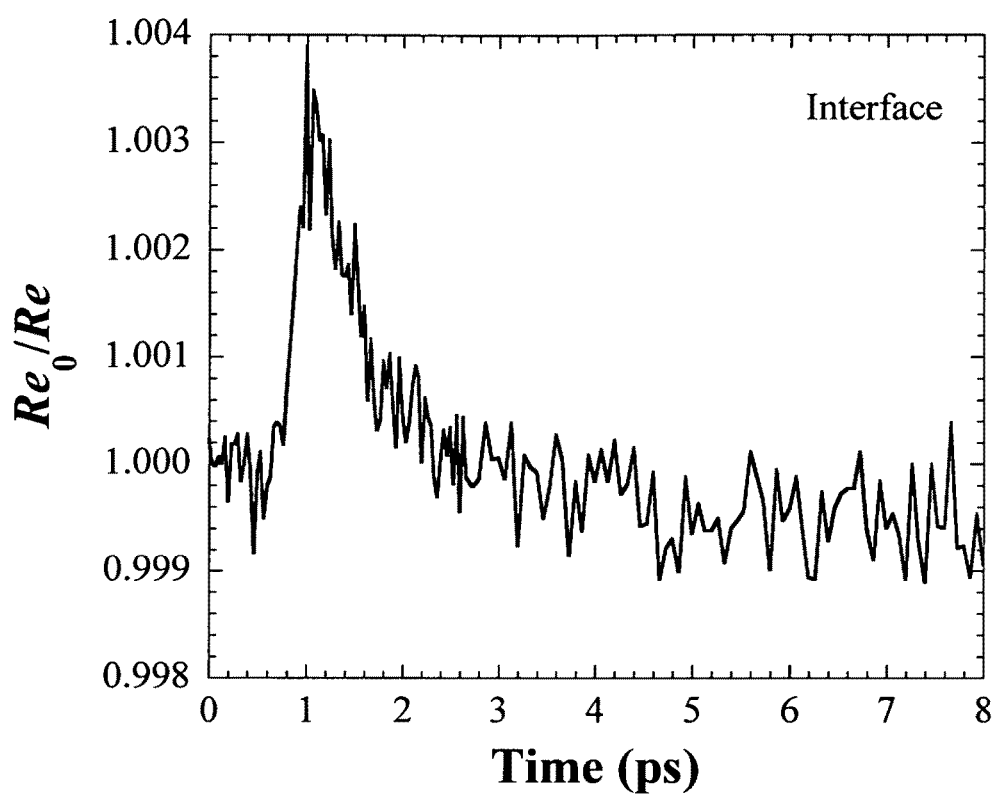
FIG. 18 shows a graph depicting the ratio of the reflection without pump over the reflection with pump ($Re_0/Re$).

In order to check the potential of the interface for fast (<ps) switching operations, pump-probe experiments have been performed at room temperature. The pump pulses have been provided by an ultrafast laser system emitting at 532 nm pulses below 100 fs at a repetition rate of 1 kHz and white light continuum produced in a sapphire plate was used as probe signal. One typical result of the reflection kinetics of the interface at 633 nm is shown in FIG. 18, which depicts the ratio of the reflection without pump over the reflection with pump ($Re_0/Re$). Turn-on and recovery time are extremely fast resulting in a kinetics profile with a full width at half maximum (FWHM) of about 600 fs. The result looks very similar to the transmission kinetics of CdTe nanocrystals [32] and the recovery time can be compared with that present in Bragg-spaced quantum well structures [47]. On the other hand, the transmission kinetics of our GaAs films did not show such a fast recovery time. In fact, the recovery time is beyond 10 ps [41, 43], favoring once again the interface for switch applications.

In summary, the present invention uses reflective LC at the glass/GaAs interface as new and resourceful core for light driven logic operations. All-optical and hybrid signal modulations with the capability to exchange negative and positive logics have been demonstrated. The present invention offers further simplification of these devices and operations, and the results show that photonic switching can be addressed in extremely straightforward ways by using thin films on glass. The present invention thus offers the potential of glass/GaAs interfaces to serve as ultra fast-responding all-optical switch fabrics.

The present invention may also be used in a system that uses several optical switching sells as described herein, to take advantage of the increased fan-out offered by the operation of the device in the reflective mode.

Figure 19:
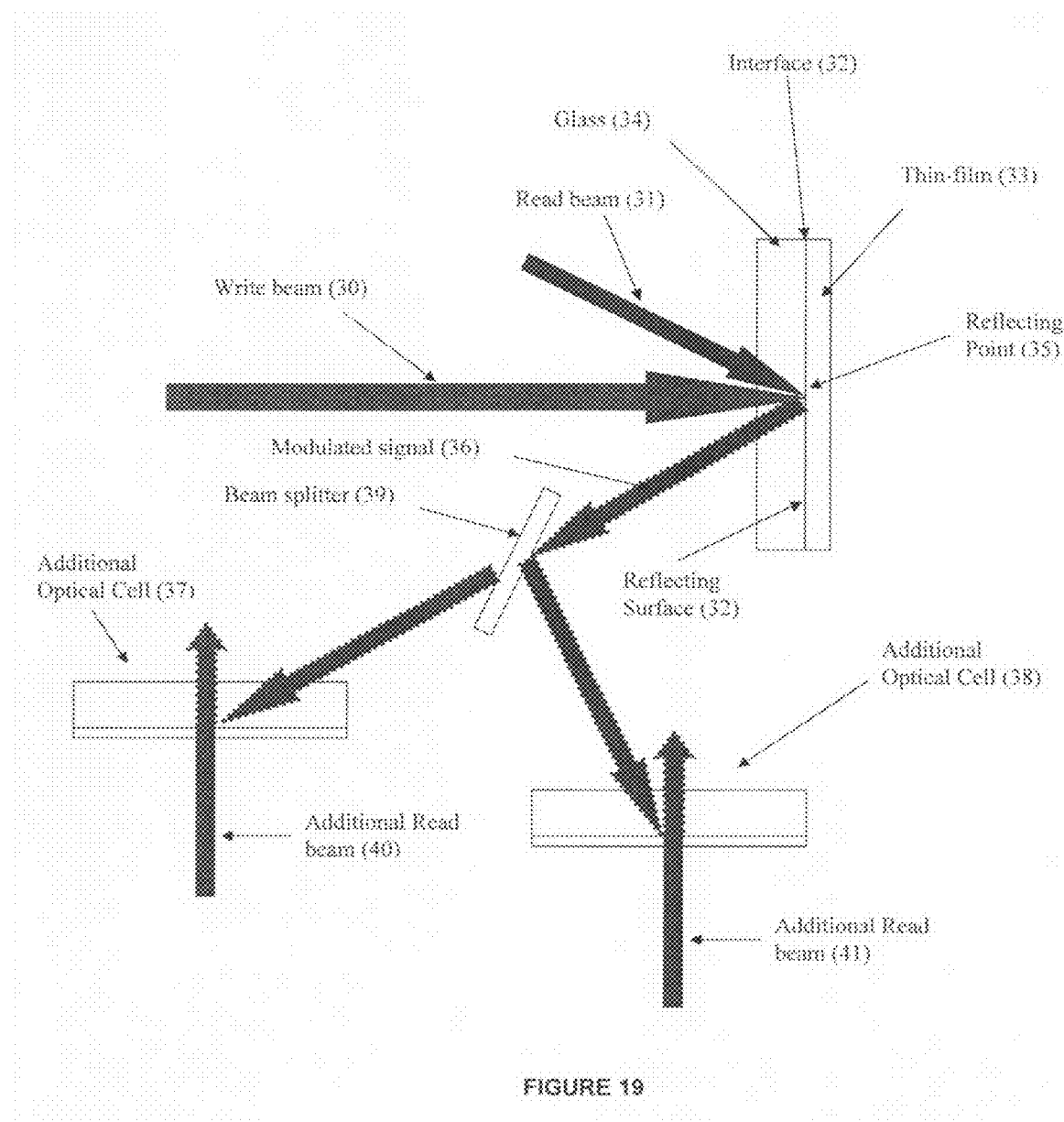
FIG. 19 shows a schematic of an apparatus that produces the optical switching process in a multi-cell apparatus, in accordance with another embodiment of the present invention.

As can be appreciated from FIG. 19, the present invention may include a plurality of optical switching cells as described in more detail with respect to FIGS. 1, 2 and 2a above, so as to produce an array of switching cells. This array may include additional cells operating either in the transmissive or reflective mode, although cells operating in the reflective mode are preferred.

FIG. 19 shows a schematic of a basic arrangement for a switch in accordance with one embodiment of the present invention including an apparatus that produces the optical switching process in accordance with one embodiment of the present invention. FIG. 19 shows generally the switching concept of the present invention as applied in a multi-cell array. By means of an optical shutter, the irradiation of the green laser 30 is turned on and off causing a digital decrease and increase, respectively, in the transmission of the red laser light in beam 31.

FIG. 19 shows the first light beam 31 is reflected of a reflective material surface 32 which as shown is a thin film GaAs layer 33 on a transparent substrate 34 (i.e., fused silica glass; in this embodiment the thin film GaAs layer 33 is placed on a side of the fused silica glass such that the first light beam 31 passes through the transparent glass substrate 34 before reflecting from the reflective material surface 32).

FIG. 19 also shows that the second light beam 30 is directed at the reflective material surface 32 and at the point where first light beam 31 reflects from the reflective material surface 32 (i.e., reflecting point 35).

Following reflection from and modulation at the reflecting point 35, the emerging light beam 36 may be directed to one or more optical cells (e.g., 37 and 38; shown operating in the transmissive mode for simplicity but preferably operating as well in the reflective mode) that may be operated either in the in the transmissive or reflective modes, or in both.

The emerging beam 36 from each optical cell may be passed through a beam splitter 39 to divide the beam for further interaction with additional optical cells to impose modulation onto additional beams (e.g., 40 and 41), which cells may operate either in the transmissive mode (as shown) or in the reflective mode (as shown in other figures such as FIGS. 1, 2, 2a and 14).

One of the advantages of the present invention is that optical cells according to the present invention allow for greater preservation of beam strength through successive beam splits where desirable, thus allowing for greater fan out through an array of cells. This is one of the advantages the present invention has over cells operating exclusively in the transmissive mode.

Still other embodiments of the present invention are shown in FIGS. 20-25.

Figure 20:
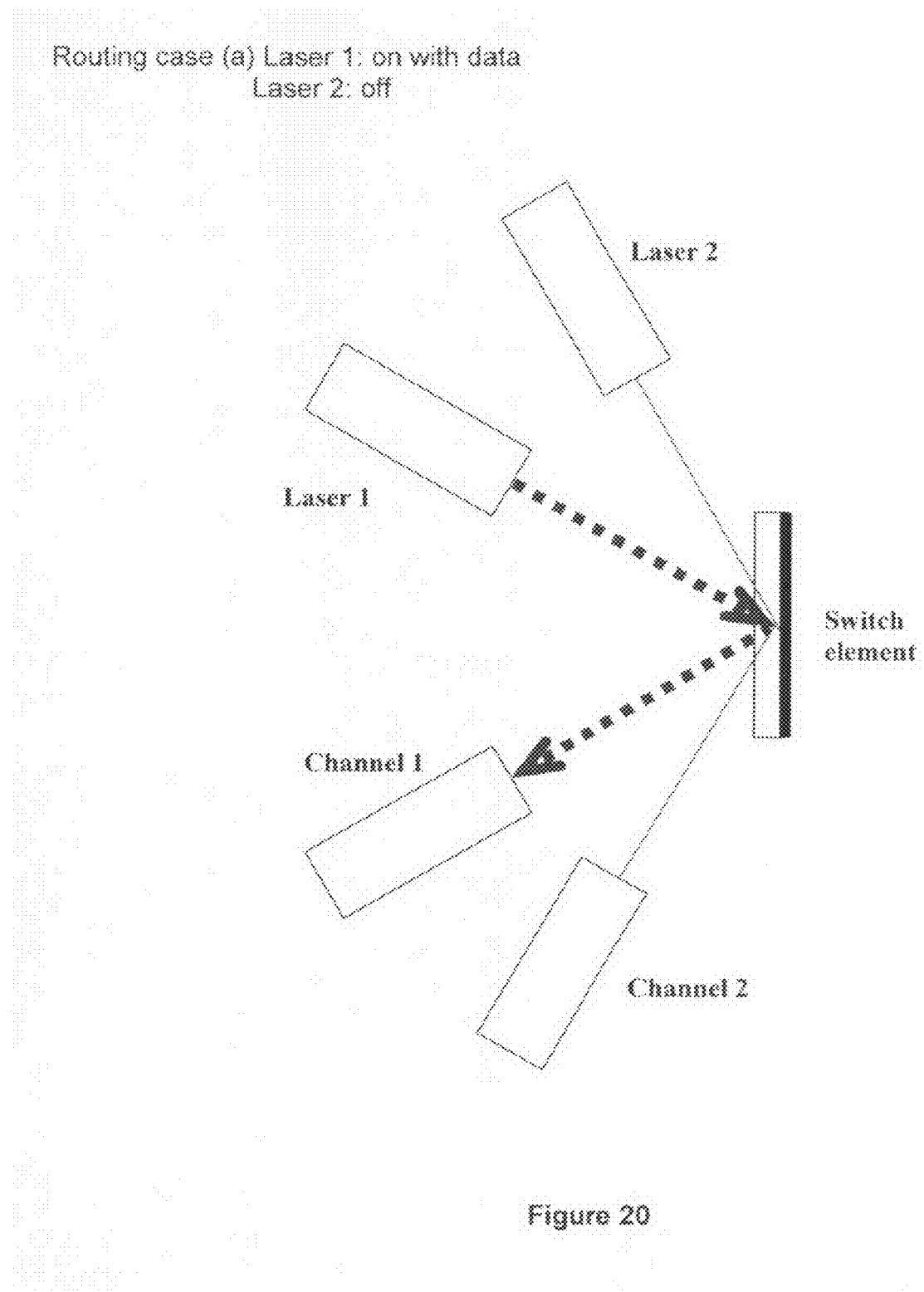
FIGS. 20-25 show schematics of optical switching apparatus, in accordance with further embodiments of the present invention.

FIG. 20 shows routing wherein the input data, which is modulated on Laser 1, is getting routed to either channel 1 or channel 2. A channel can be a receiver or a connection to another optical network. (Strong lines have high laser power, thin lines have low or no laser power, dashed lines contain data). In case (a) in FIG. 20, the data is modulated on Laser 1 and Laser 2 is off. No switching occurs and the data goes to Channel 1.

Figure 21:
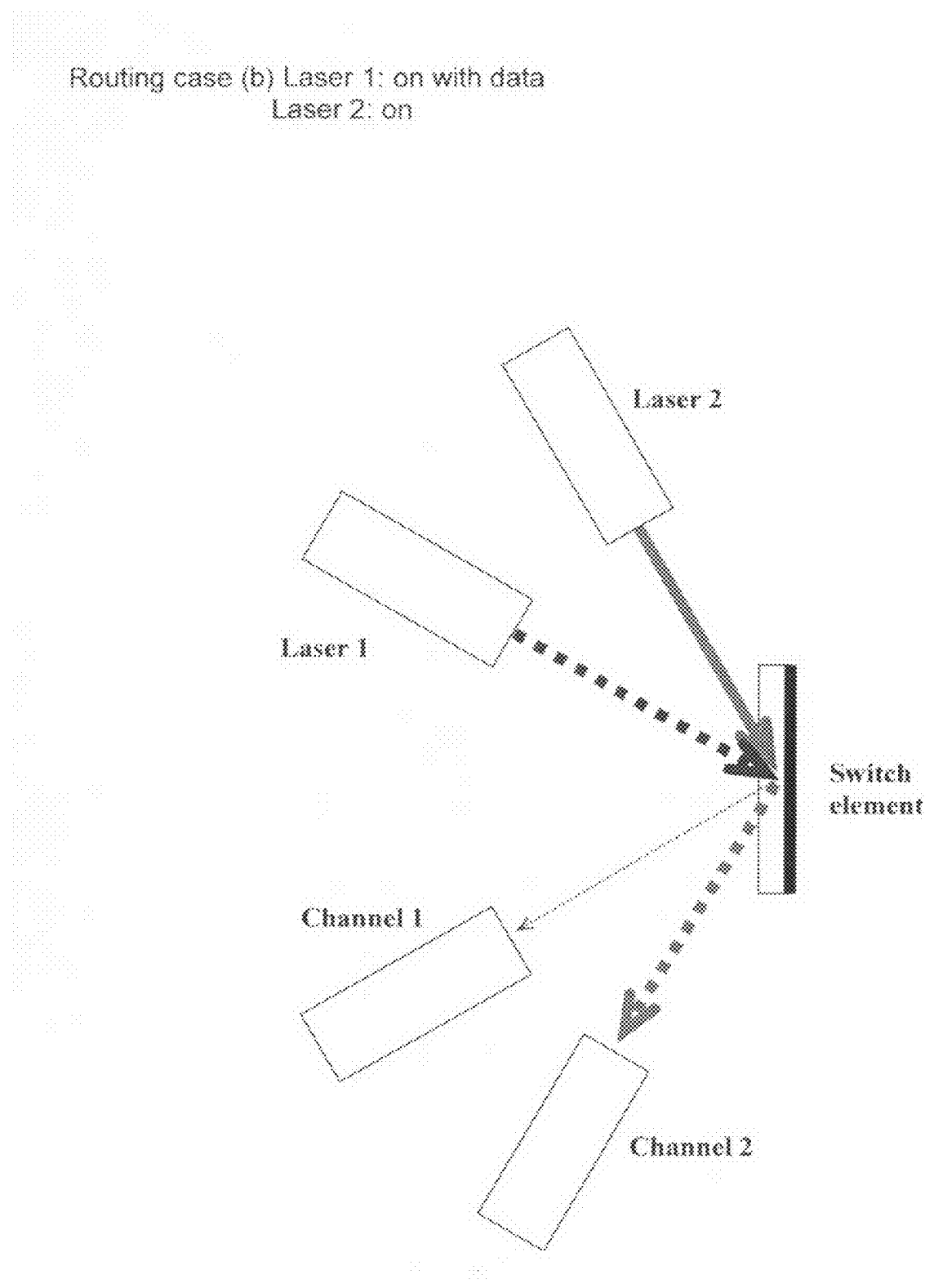
Figure 22:
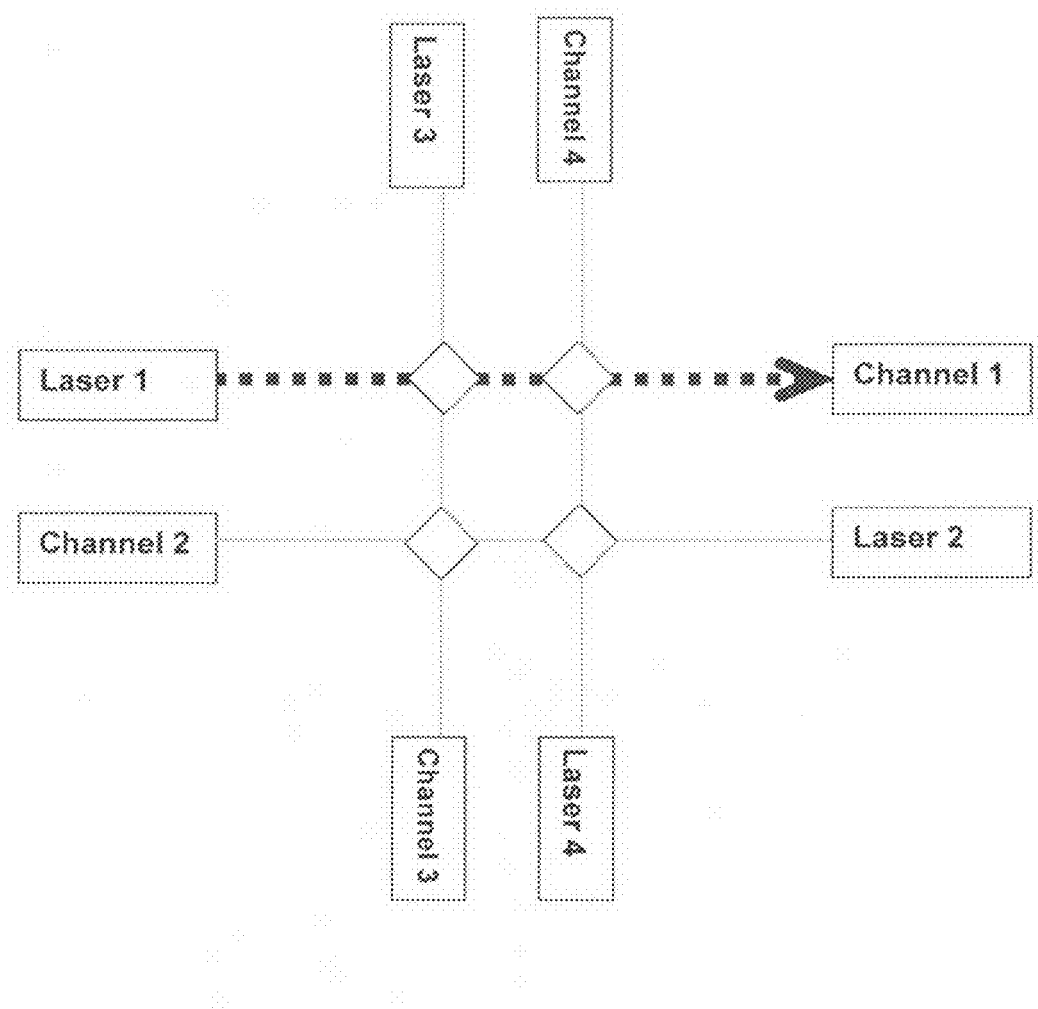
Figure 23:
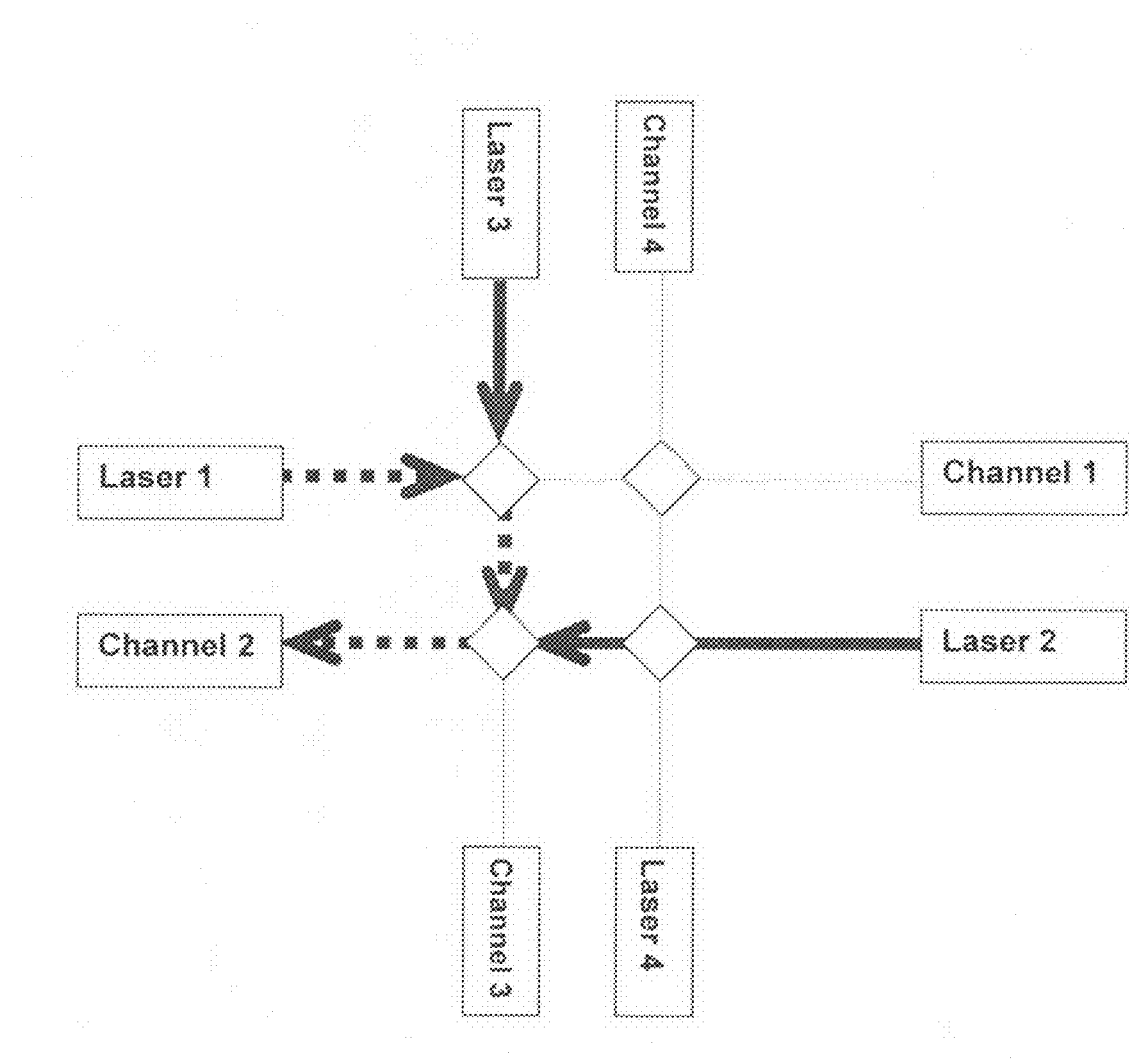
Figure 24:
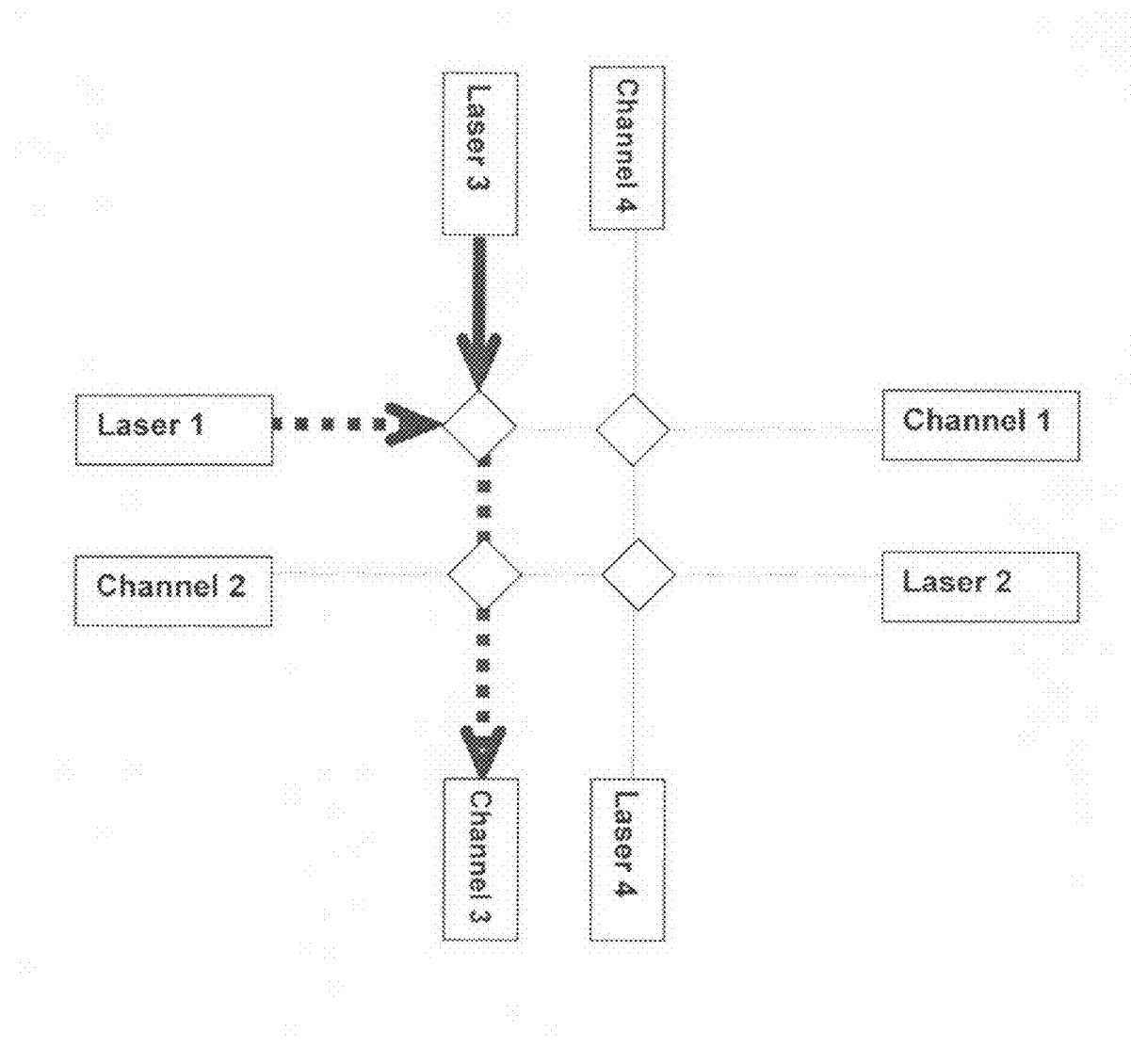
Figure 25:
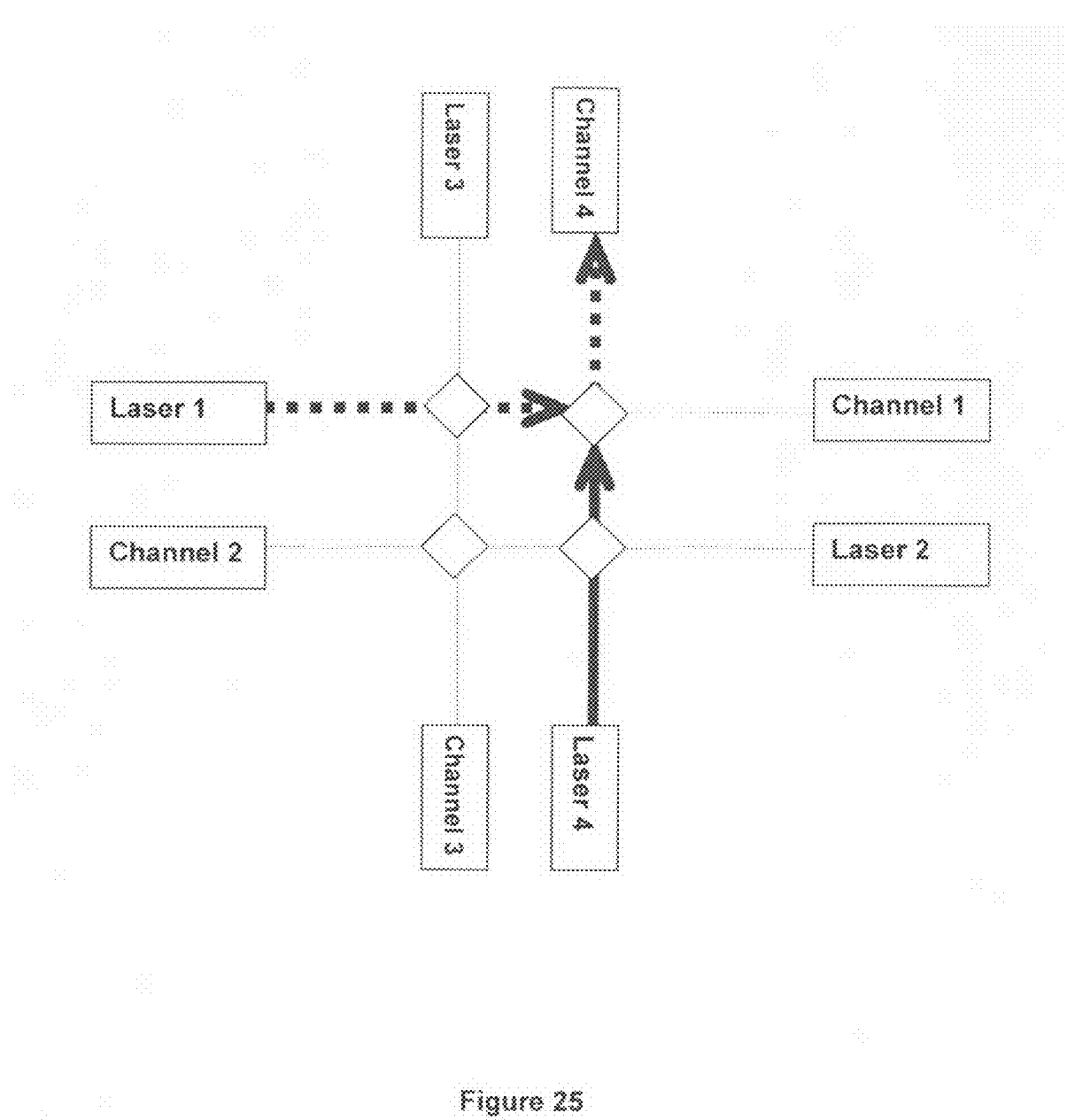

In case (b) in FIG. 21, the data is modulated on Laser 1 and Laser 2 is on. Optical switching occurs and Laser 2 is modulated with the data of Laser 1; the data goes to Channel 2. In addition, Laser 2 switches Laser 1, which means it blocks it and no signal (data) reaches Channel 1. The data is redirected to Channel 2.

These schematics demonstrate that the present invention can use multiple beams to cause modulated data to be routed to different channels.

FIGS. 22-25 show a switching array that may be formed in accordance with another embodiment of the present invention. In general, the switch redirects the data from one channel to the other channel. This can be extended to form a switching array with more than one input laser and more than one channel. The schematic is shown in FIGS. 22-25 wherein the switching element as shown in FIGS. 20-21 is replaced by a "◊" shaped symbol. In the case where the beam angles in the routing sample are not as good for the switching array, this may be corrected with special optical equipment, such as mirrors.

The input data, which is modulated on Laser 1, is getting routed either to channel 1, channel 2, channel 3, or channel 4. In this configuration laser 2, laser 3 or laser 4 also may be modulated with the input data. A channel can be a receiver or a connection to another optical network. (Strong lines have high laser power, thin lines have low or no laser power, dashed lines contain data). The advantage of this configuration is its symmetry. Every laser can be routed to every output channel. Therefore, every laser can function as an input data laser, and the data can be routed to every output channel. The switching array can be extended to more than one input laser and more than 4 channels.

In the next four schematics the data of laser 1 is routed either to channel 1, channel 2, channel 3 or channel 4. Instead of laser 1 also laser 2, laser 3 or laser 4 may be used as input laser.

This embodiment demonstrates that the present invention may be used in a multiplex switching array in accordance with another embodiment of the invention.

REFERENCES

1. Gibbs H M, Tarng S S, Jewell J L, Weinberger D A, Tai K, Gossard A C, McCall, S L, Passner A and Wiegmann W 1982 *Appl. Phys. Lett.* 41 221
2. Jewell J L, Lee Y H, Duffy J F, Gossard A C and Wiegmann W 1986 *Appl. Phys. Lett.* 48 1342
3. Gibbs H M and Khitrova G 1990 *Nonlinear Photonics* ed by H M Gibbs, G Khitrova and N Peyghambarian (Berlin: Springer) p 1
4. Eason R W and Miller A eds 1993 *Nonlinear Optics in Signal Processing* (London: Chapman & Hall)
5. Midwinter J E ed 1993 *Photonics in Switching* (San Diego: Academic) Vol. I and Vol. II
6. Bates R J 2001 *Optical Switching and Networking Handbook* (New York: McGraw-Hill)
7. A. Erlacher and B. Ullrich, "All-optical digitizing of laser transmission through thin-film Gaas on glass," *Semicond. Sci. Technol.* 19, L9-L12 (2004).
8. Erlacher A, Miller H and Ullrich B 2004 *J. Appl. Phys.* 95 2927
9. Varshini Y P 1967 *Physica* (Netherlands) 34 149
10. Lax M 1977 *J. Appl. Phys.* 48 3919
11. Artur Erlacher, Bruno Ullrich, Laser crossing in thin-film GaAs for all-optical computing realizations; Presented SPIE Conference July 2005
12. H. M. Gibbs *Optical Bistability: Controlling Light With Light* (*Optics and Photonics Series*), Academic Press, 1985.
13. B. S. Wherrett and D. C. *Hutchings in Nonlinear Optics in Signal Processing*, R. W. Eason and A. Miller, Eds. Chapman & Hall, London, 1993, Ch. 5, p. 145.
14. A. L. Lentine and D. A. B. Miller, "Evolution of the SEED technology: bistable logic gates to optoelectronic smart pixels", *IEEE J. of Quantum Electronics*, 29, 655-669 (1993).
15. W. W. Gibbs, "Computing at the speed of light", *Scientific American*, November, 81-87 (2004).
16. S. Shepard, *Optical Networking Crash Course*, McGraw-Hill, New York, 2001.
17. A. Erlacher, H. Miller, and B. Ullrich, "Low-power all-optical switch by superposition of red and green laser irradiation in thin-film cadmium sulfide on glass," *J. Appl. Phys.* 95, 2927-2929 (2004).
18. A. Erlacher and B. Ullrich, "All-optical digitizing of laser transmission through thin-film Gaas on glass," *Semicond. Sci. Technol.* 19, L9-L12 (2004).
19. B. Ullrich, A. Erlacher, and E. O. Danilov, "Switch performance and electronic nature of photonic laser digitizing through thin GaAs films on glass," *Semicond. Sci. Technol.* 19, L111-L114 (2004).
20. A. Erlacher, B. Ullrich, R. J. Konopinski, and H. J. Haugan, "Optical gate realization by laser crossing in thin-film semiconductors on glass" in Proceedings of SPIE Vol. 5723 *Optical Components and Materials II*, edited by Shibin Jiang and Michel J. Digonnet, (SPIE, Bellingham, Wash., 2005) 179-186.
21. B. Ullrich, A. Erlacher, S. Yano, R. Schroeder, T. G. Gerasimov, and H. J. Haugan, "Preparation of thin-film GaAs on glass by pulsed-laser deposition," in Proceedings of SPIE Vol. 4977 *Photon Processing in Microelectronics and Photonics II*, edited by Alberto Pique, Koji Sugioka, Peter R. Herman, Jim Fieret, Friedrich G. Bachmann, Jan J. Dubowski, Willem Hoving, Kunihiko Washio, David B. Geohegan, Frank Traeger, and Kouichi Murakami, (SPIE, Bellingham, Wash., 2003) 180-187.
22. Hajto J and Janossy I 1983 *Phil. Mag. B* 47 347
23. Gibbs H M 1985 *Optical Bistability: Controlling Light with Light* (San Diego, Calif.: Academic)
24. Wherrett B S and Hutchings D C 1993 *Nonlinear Optics and Signal Processing*, ed Eason R W and Miller A (London: Chapman & Hall) p 145
25. Henneberger F and Rossmann H 1984 *Phys. Status Solidi* (b) 121 685
26. Bouchenaki C Ullrich B Zielinger J P Cong H N and Chartier P J. 1990 *J. Crystal Growth* 101 797
27. Wherrett B S 1991 *Semicond. Sci. Technol.* 6 A65
28. Walker A C Wherrett B S and Smith S D 1990 *Nonlinear Photonics*, ed Gibbs H M Khitrova G and Peyghambarian N (Berlin: Springer) p 91
29. Ullrich B and Kobayashi T 1994 *Optical Review* 2 43
30. Yoo S J B Bhat R Caneau C and Koza M A 1995 *Appl. Phys. Lett.* 66 3410
31. Murphy E J (ed) 1999 *Integrated Optical Circuits and Components* (New York: Marcel Dekker)
32. Padilha L A, Neves A A R, Rodriguez E Cesar C L Barbosa L C and Brito Cruz C H 2005 *Appl. Phys. Lett.* 86 161111
33. Tatsuura S Matsubara T Mitsu H Sato Y Iwasa I Tian M and Furuki M 2005 *Appl. Phys. Lett.* 87 251110

34. Papadimitriou G I Papazoglou C and Pomportsis S 2003 *J. Lightwave Technol.* 21 384
35. Shepard S 2001 *Optical Networking Crash Course* (New York: McGraw-Hill)
36. Iga K and Kokubun Y (eds) 2006 *Encyclopedic Handbook of Integrated Optics* (Boca Raton, Fla.: Taylor & Francis)
37. Bates R J 2001 *Optical Switching and Networking Handbook* (New York: McGraw-Hill)
38. Gibbs W W 2004 *Scientific American* November 2004 81
39. Erlacher A Miller H and Ullrich B 2004 *J. Appl. Phys.* 95 2927
40. Erlacher A and Ullrich B 2004 *Semicond. Sci. Technol.* 19 L9
41. Ullrich B Erlacher A and Danilov E O 2004 *Semicond. Sci. Technol.* 19 L111
42. Erlacher A Ullrich B Konopinski R J, and Haugan H J 2005 *Proc. SPIE* 5723 179
43. Erlacher A and Ullrich B 2005 *Proc. SPIE* 5907 22
44. Ullrich B Erlacher A Yano S Schroeder R Gerasimov T G and Haugan H J 2003 *Proc. SPIE* 4977 180
45. Ullrich B and Schroeder R 2001 *IEEE J. Quantum Electron.* 37 1363
46. Ullrich B and Schroeder R 2001 *Semicond. Sci. Technol.* 16 L89
47. Johnston W J Yildirim M Prineas J P Smirl A L Gibbs H M and Khitrova G 2005 *Appl. Phys. Lett.* 87 101113

The foregoing references are hereby incorporated herein by reference.

Additional background may be provided by the following U.S. patent documents, which are hereby incorporated herein by reference.

| Pat. No. | Title |
| --- | --- |
| 6,987,901 | Optical switch with 3D waveguides |
| 6,973,270 | Reflection routing method in optical packet switching network and optical packet switch for reflection routing |
| 6,917,733 | Three-dimensional optical switch with offset input-output ports |
| 6,901,179 | Optical switch and using method therefor |
| 6,862,381 | Cross-connect optical switch |
| 6,847,741 | Optically induced total internal reflection X-junction waveguide optical switch, network and optical switching method |
| 6,829,403 | Optical switch having an array of optical fibers with respective, removable disposed mirrors and a lens disposed away from an end surface of each corresponding optical fiber |
| 6,819,825 | Optical switch |
| 6,795,604 | Optical switch |
| 6,795,603 | Optical switch |
| 6,773,942 | Method for making optical switch array |
| 6,765,193 | Optical touch switch structures |
| 6,748,130 | Optical switch and using method therefor |
| 6,707,961 | Optical cross-connect switch with decreased polarization-dependent loss |
| 6,687,428 | Optical switch |
| 6,665,461 | Total internal reflection optical switch and method of operating the same |
| 6,647,171 | MEMS optical switch actuator |
| 6,610,974 | Positioning a movable reflector in an optical switch |
| 6,597,825 | Optical tap for an optical switch |
| 6,594,411 | Optical switch |
| 6,591,031 | Optical switch with movable mirror |
| 6,567,574 | Modular three-dimensional optical switch |
| 6,542,658 | Optical switch |
| 6,529,655 | Frustrated total internal reflection optical switch using waveguides and method of operation |
| 6,522,802 | Optical switch using support structures with both fixed mirrors and pivotable mirrors |
| 6,516,111 | Cascaded integrated fiber array optical switch and method of operation |
| 6,516,107 | 2.times.2 integrated fiber array optical switch and method of operation |
| 6,515,791 | Active reflection and anti-reflection optical switch |
| 6,511,191 | Optical switch system and method for aligning optical axis therein |
| 6,493,139 | Optical switch |
| 6,487,014 | High isolation optical switch, isolator or circulator having thin film polarizing beam-splitters |
| 6,477,292 | Reflection mirror type optical fiber switch |
| 6,449,404 | Optical switch |
| 6,445,845 | Optical switch |
| 6,408,113 | Multi-mirror reflection optical switch structure |
| 6,396,972 | Thermally actuated optical add/drop switch |
| 6,393,175 | Integrated fiber array optical switch and method of operation |
| 6,393,174 | Integrated fiber array optical switch using double-pass propagation and method of operation |
| 6,360,034 | Reflection based nonmoving part optical switch |
| 6,356,678 | Optical deflection switch |
| 6,172,778 | Compact optical crossbar switch |
| 6,154,586 | Optical switch mechanism |
| 6,014,478 | Optical switch |
| 5,911,018 | Low loss optical switch with inducible refractive index boundary and spaced output target |
| 5,771,321 | Micromechanical optical switch and flat panel display |
| 5,629,993 | Compact optical switch |
| 5,619,601 | Optical switch and optical distributor using polarization control and partial reflection |
| 5,566,263 | System for tuning an integrated optical switch element |
| 5,446,809 | All fiber wavelength selective optical switch |
| 5,444,802 | Optical switch |
| 5,444,723 | Optical switch and Q-switched laser |
| 5,425,115 | Polarization insensitive optical switch |
| 5,418,640 | Spatially graded optical switch |
| 5,369,718 | Total internal reflection-type optical waveguide switch |
| 5,329,137 | Integrated total internal reflection optical switch utilizing charge storage in a quantum well |
| 5,170,169 | Quasi-optical transmission/reflection switch and millimeter-wave imaging system using the same |
| 5,162,944 | Optical space switch and network for such optical space switches |
| 5,132,822 | Optical switch |
| 5,077,813 | Optical switch |
| 5,018,842 | Optical switch device |

The foregoing references are hereby incorporated herein by reference.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

What is claimed is:

1. A method of providing a pulsed optical signal by changing the amount of reflected light from a beam of light, said method comprising:
   (a) providing a substrate bearing a film of a reflective material, said reflecting material is selected from the group consisting of semiconductive materials;
   (b) directing a first beam of light at a reflecting point upon said reflective material so as to create a reflecting beam therefrom;
   (c) directing a pulsed second beam of light at said reflecting point upon said reflective material, said reflective material being supplied with an electrical contact placed on said reflective material so as to be capable to placing a voltage through said reflective material at said reflecting point, so as to create pulses in the amount of light in said reflecting beam thereby creating a pulsed reflecting beam; and (d) transmitting said reflecting beam along an optical conduit.

2. A method according to claim 1 additionally comprising receiving said reflected beam at a location remote from said reflective point.

3. A apparatus for providing a pulsed optical signal by changing the amount of reflected light from a beam of light, said apparatus comprising:

(a) a substrate bearing a film of a reflective material, said reflecting material is selected from the group consisting of semiconductive materials;

(b) a source of a first beam of light directed at a reflecting point upon said reflective material so as to create a reflecting beam therefrom;

(c) a source of a second beam of light directed at said reflecting point upon said reflective material, said reflective material being supplied with an electrical contact placed on said reflective material so as to be capable to placing a voltage through said reflective material at said reflecting point, and of sufficient energy to alter the amount of light in said reflecting beam; and (d) an optical conduit for transmitting said reflecting beam to a location remote from said reflecting point.

* * * * *